(12) United States Patent
Stavitskii et al.

(10) Patent No.: US 12,248,289 B2
(45) Date of Patent: Mar. 11, 2025

(54) SYSTEMS AND METHODS FOR GENERATING A CONTINUOUS MUSIC SOUNDSCAPE USING AUTOMATIC COMPOSITION

(71) Applicant: Endel Sound GmbH, Berlin (DE)

(72) Inventors: Oleg Stavitskii, Berlin (DE); Kyrylo Bulatsev, Frankfurt (DE); Philipp Petrenko, Berlin (DE); Dmitry Bezugly, Kaliningrad (RU); Evgeny Gurzhiy, Berlin (DE); Dmitry Evgrafov, Moscow (RU)

(73) Assignee: Endel Sound GmbH, Berlin (DE)

( * ) Notice: Subject to any disclaimer, the term of this patent is extended or adjusted under 35 U.S.C. 154(b) by 423 days.

(21) Appl. No.: 17/815,126

(22) Filed: Jul. 26, 2022

(65) Prior Publication Data

US 2022/0365504 A1 Nov. 17, 2022

Related U.S. Application Data

(63) Continuation-in-part of application No. 17/665,353, filed on Feb. 4, 2022, now abandoned, which is a
(Continued)

(51) Int. Cl.
*G05B 19/042* (2006.01)
*H04L 12/28* (2006.01)

(52) U.S. Cl.
CPC ........ *G05B 19/042* (2013.01); *H04L 12/2816* (2013.01); *G05B 2219/2614* (2013.01)

(58) Field of Classification Search
CPC .......... G05B 19/042; G05B 2219/2614; G05B 2219/2642; H04L 12/2816; H04L 12/2829; H04L 2012/2849
See application file for complete search history.

(56) References Cited

U.S. PATENT DOCUMENTS

| 7,396,990 B2 | 7/2008 | Lu et al. |
| 7,680,906 B2 | 3/2010 | Helander |

(Continued)

FOREIGN PATENT DOCUMENTS

| JP | 2017124165 A | 7/2017 |
| RU | 2632131 C2 | 10/2017 |

(Continued)

*Primary Examiner* — Mohammad Ali
*Assistant Examiner* — Sheela Rao
(74) *Attorney, Agent, or Firm* — Polsinelli

(57) ABSTRACT

Disclosed are systems and techniques for creating a personalized sound environment for a user. Output is received from a plurality of sensors, wherein the sensor output detects a state of a user and an environment in which the user is active. Two or more sound sections for presentation to the user are selected from a plurality of sound sections, the selecting based on the sensor output and automatically determined sound preferences of the user. A first sound phase is generated, wherein the first sound phase includes the two or more selected sound sections. A personalized sound environment for presentation to the user is generated, wherein the personalized sound environment includes at least the first sound phase and a second sound phase. The personalized sound environment is presented to the user on a user device.

20 Claims, 14 Drawing Sheets

Related U.S. Application Data continuation of application No. 16/674,844, filed on Nov. 5, 2019, now Pat. No. 11,275,350.

(60) Provisional application No. 62/755,725, filed on Nov. 5, 2018.

(56) References Cited

U.S. PATENT DOCUMENTS

| | | |
|---|---|---|
| 7,786,369 B2 | 8/2010 | Eom et al. |
| 8,259,192 B2 | 9/2012 | Nair |
| 8,644,971 B2 | 2/2014 | Weinstein |
| 9,513,867 B1 | 12/2016 | Tokunaga |
| 9,990,413 B2 | 6/2018 | Jung et al. |
| 2007/0198663 A1 | 8/2007 | Helander |
| 2009/0108082 A1 | 4/2009 | Goldman et al. |
| 2011/0125777 A1 | 5/2011 | Begeja et al. |
| 2014/0260915 A1 | 9/2014 | Okuda |
| 2015/0204561 A1 | 7/2015 | Sadwick et al. |
| 2016/0151603 A1* | 6/2016 | Shouldice ............ A61B 5/486 600/26 |
| 2016/0234034 A1 | 8/2016 | Mahar et al. |
| 2016/0302013 A1* | 10/2016 | Andersson ........ A61N 1/36038 |
| 2017/0060519 A1 | 3/2017 | Roberdet |
| 2017/0109983 A1 | 4/2017 | Flint et al. |
| 2017/0195130 A1 | 7/2017 | Landow et al. |
| 2017/0345267 A1 | 11/2017 | Fint et al. |
| 2018/0025616 A1 | 1/2018 | Lin et al. |
| 2019/0049968 A1 | 2/2019 | Dean et al. |
| 2020/0132330 A1 | 4/2020 | Mower et al. |
| 2020/0132332 A1 | 4/2020 | Mower et al. |
| 2020/0168191 A1* | 5/2020 | Silverstein ............ G10H 1/368 |
| 2022/0310049 A1* | 9/2022 | Stavitskii ............ G10H 1/0025 |

FOREIGN PATENT DOCUMENTS

| | | |
|---|---|---|
| WO | 2012001566 A1 | 1/2012 |
| WO | 2014/185061 A1 | 11/2014 |

* cited by examiner

Fig. 7

| | 704 | 706 | 708 | 710 | 712 | 714 |
|---|---|---|---|---|---|---|
| | Layer 1 | Focus | Time | Location | — | ... |
| | Layer 2 | Relax | Time | Location | Weather | ... |
| | Layer 3 | Relax | Time | — | — | ... |
| | Layer 4 | Focus | Time | Location | — | ... |
| | Layer 5 | Sleep | Time | — | Weather | ... |
| | ... | | | | | |
| | Layer N | Sleep | — | Location | Weather | ... |

Sound Layers

702

SYSTEMS AND METHODS FOR GENERATING A CONTINUOUS MUSIC SOUNDSCAPE USING AUTOMATIC COMPOSITION

CROSS-REFERENCE TO RELATED APPLICATIONS

This application is a continuation-in-part of U.S. patent application Ser. No. 17/665,353 filed Feb. 4, 2022 and entitled "SYSTEM AND METHOD FOR CREATING A PERSONALIZED USER ENVIRONMENT," which is a continuation of U.S. patent application Ser. No. 16/674,844, filed Nov. 5, 2019 and entitled "SYSTEM AND METHOD FOR CREATING A PERSONALIZED USER ENVIRONMENT", which claims the benefit of U.S. Provisional Patent Application No. 62/755,725, filed Nov. 5, 2018, the contents of which are each herein incorporated by reference in their entirety.

BACKGROUND

Technological innovation, while improving productivity, has increasingly raised stress levels in day-to-day life. The daily demands on life have become more numerous and fast-paced while the level of daily distractions has increased. New systems need to be implemented in order to address this.

Individual attempts to deal with these stress-causing issues frequently involve activities such as meditation and exercise, often accompanied by music or soundscapes to augment the experience. However, these soundscapes are generally homogenous, of limited length and are not adaptive to a user's evolving environment or state. What is needed is a system for automatically and dynamically accessing information relevant to an individual's state and surroundings and present to the individual a personalized transmission(s) of sound for various activities, such as relaxation, focus, sleep, exercise, etc.

SUMMARY

The problems and issues faced by conventional solutions will be at least partially solved according to one or more aspects of the present disclosure. Various features according to the disclosure are specified within the independent claims, additional implementations of which will be shown in the dependent claims. The features of the claims can be combined in any technically meaningful way, and the explanations from the following specification as well as features from the figures which show additional embodiments of the invention can be considered.

According to an aspect of the present disclosure, provided are systems and methods for generating a continuous soundscape using automatic composition.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. In the drawings, like reference numbers can indicate identical or functionally similar elements. Understanding that these drawings depict only example embodiments of the disclosure and are not therefore to be considered to be limiting of its scope, the principles herein are described and explained with additional specificity and detail through the use of the accompanying drawings in which:

FIG. 7 shows a chart of sound layers for presentation to a user based on user mode and sensory and environmental inputs.

DETAILED DESCRIPTION

Figure 1:
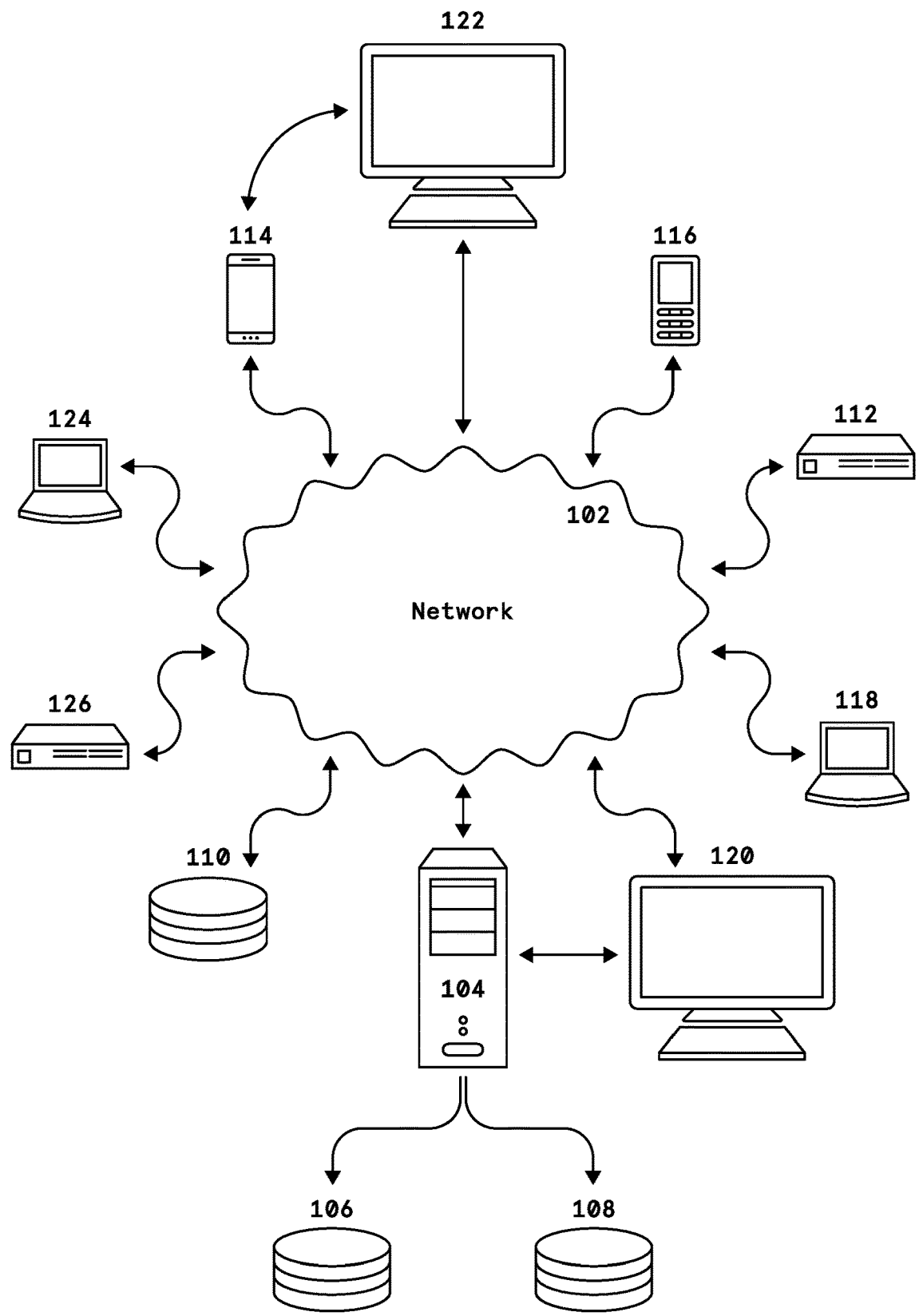
FIG. 1 illustrates an example architecture of a network for implementing a method for creating a personalized sound environment for a user.

Various example embodiments of the disclosure are discussed in detail below. While specific implementations are discussed, it should be understood that these are described for illustration purposes only. A person skilled in the relevant art will recognize that other components and configurations may be used without parting from the spirit and scope of the disclosure.

Thus, the following description and drawings are illustrative and are not to be construed as limiting the scope of the embodiments described herein. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It should be further noted that the description and drawings merely illustrate the principles of the proposed device. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed device. Furthermore, all statements herein providing principles, aspects, and embodiments of the invention, as well as specific examples thereof, are intended to encompass equivalents thereof.

Referring first to FIG. 1, there is shown an exemplary architecture of a network and system for implementing a method for creating a personalized sound environment for a user. The network 102 across which transmissions of information, data and sound in exemplary embodiments occur, can include any private or public, wired or wireless network, including but not limited to Local Area Networks, Wide Area Networks, the Internet, the World Wide Web, radio frequency (RF), Bluetooth, and a Cloud-based network. There is shown an exemplary network sound server 104 and one or more databases and/or storage devices 106, 108, and 110. There may be more servers, more databases, and more storage devices 110 than those displayed in FIG. 1, with the servers minimally configured with memory, storage media, at least one processor, communication resources, and with databases and files being external to or integrated with the servers. There are one or more user devices 114-120, platforms, or channels, for utilizing the personalized sound system and for the presentation of personalized sounds to individual users. For convenience and not limitation, users are collectively represented as a smart phone 114. The system 100 can affect the analysis of sensor data, environmental information, user input, and library sounds; and transmission of personalized sounds to users of devices 114 through the network sound server 104 and network 102. The personalized sound system 100 extends to software, programs, and routines within storage media on each of the user devices and network server.

The user devices 114 for receiving, playing, and displaying the personalized sounds are representatively shown as a smart phone 114, a cell phone 116, a portable tablet or laptop computer 118, and a desktop computer 120. Examples of user devices 114 include, but are not limited to, wireless user equipment and communication devices, such as, for example, mobile telephones, smart phones, personal digital assistants, electronic readers, portable electronic tablets, personal computers, and laptop computers. Each representative user device 114 minimally comprises a processor, a memory coupled to the processor, computer readable media, facilities for entering information into the user device 114, and an antenna or other wired or wireless connection device coupled to the processor for receiving and transmitting information, messages, commands or instructions, and sounds. A display on the user device 114 can include touch screen technology for the entry of user information required by the system and information related to the environment, including location, of the user. The information can be entered, for example, in text form or by touching action buttons displayed on the screen or integrated with the body of the user device 114. Alternately, user entry of information can be through use of a physical or touch screen keyboard or by voice.

Output and readings from a plurality of sensor devices 112 are received by the sound system 100, and particularly by the network sound server 104. The information and data received from the sensor devices 112 include information related to the user and the environment in which the user is situated. This sensor data is utilized to assist with selection of sounds to present to the user, as discussed in more detail below.

The sounds system 100 alternately includes one or more receiver devices 122 and 124 for receiving information and commands from the user devices 114. These receiver devices are collectively represented as a computer 122. The receiver devices 122 can be any type of computing device having communications and display facilities in the same manner of the user devices 114. One to many receiver devices 122 are in communication with the system 100 and can communicate from a plurality of different devices and via a plurality of different communication protocols, as described above regarding the remote user device 114. While FIG. 1 shows all communications being directed to the network sound server 104, exemplary embodiments are not so limited; and communications can be provided directly through the network 102 between the user devices 114 and the receiver devices 122 for receiving information from the user devices 114 and presenting sounds to the user devices 114.

Exemplary embodiments are implemented on the network sound server 104 and on the computers of the user devices 114 and, alternately on the receiver devices 122. Computer readable and executable instructions, or software, are provided for directing the processing of the computers of the exemplary devices 114, 122, and 104, including processing the steps of exemplary embodiments of the sound system 100. The computer executable instructions, when executed by the computers 114, 122, and 104 and/or the processors associated with each of said computers, provide for the presentation of personalized sounds to the user devices 114 and the control of the user's environment.

One or more storage devices 106, 108, and 110 are provided for storage of information regarding resources available for composing sounds to be presented to the user devices 114. This information includes, but is not limited to, user profiles, note sequence files, raw audio files, files of single note sounds, sound tones, and sounds from musical instruments. The stored information can also include past sounds presented to the user. The storage devices can retain data and information as files, libraries, and directories, for example. Access to and usage this information to compose sounds to be presented to the user is discussed in more detail below.

Computer readable media includes computer storage media, which includes volatile and non-volatile media, removable and non-removable media implemented in any method or technology for the storage of information, including computer readable instructions, data structures, display templates, and responder information. Computer storage media includes, but is not limited to magnetic media (e.g., a hard disk), non-transitory memory, optical media (e.g., a DVD), memory devices (e.g., random access memory), and the like. In some embodiments, computer readable instructions are configured such that, when executed by a processor, the instructions cause the processors of the exemplary computers 114, 122, and 104 to perform steps described below of the sound system (e.g., steps described below with reference to the flow chart shown in FIG. 2). In other embodiments, the exemplary computers 114, 122, and 104 are configured to perform steps described below without the need for instructions. Therefore, the features of the present embodiments described herein may be implemented in any suitable combination of hardware and/or software. Computer storage media does not include a carrier wave or any other propagated data signal.

The system and method described herein can automatically compose personalized soundscapes, based on one or more sensor inputs, for various modes and purposes, which can include but are not limited to sleep, focus, exercise, etc. In some examples, the automatic composition of personalized soundscapes includes an automatic and/or dynamic (e.g., real-time) modification of a personalized soundscape that was previously generated or composed according to the system and method described herein. In some embodiments, the methodology for generating personalized sound environments for users is based on circadian rhythms, pentatonic scale, and sound masking. The generated sounds automatically adapt, without any user input, to different inputs, such as time of day, weather, heart rate, and location. The process begins with the user opening an application on the user's device. The user's device is preferably a portable device connected to a network such as the Internet. However, the disclosed system and method will perform well on a user device that is not connected to a network or on a user device that is not portable, with local storage files, media, and software.

Figure 2:
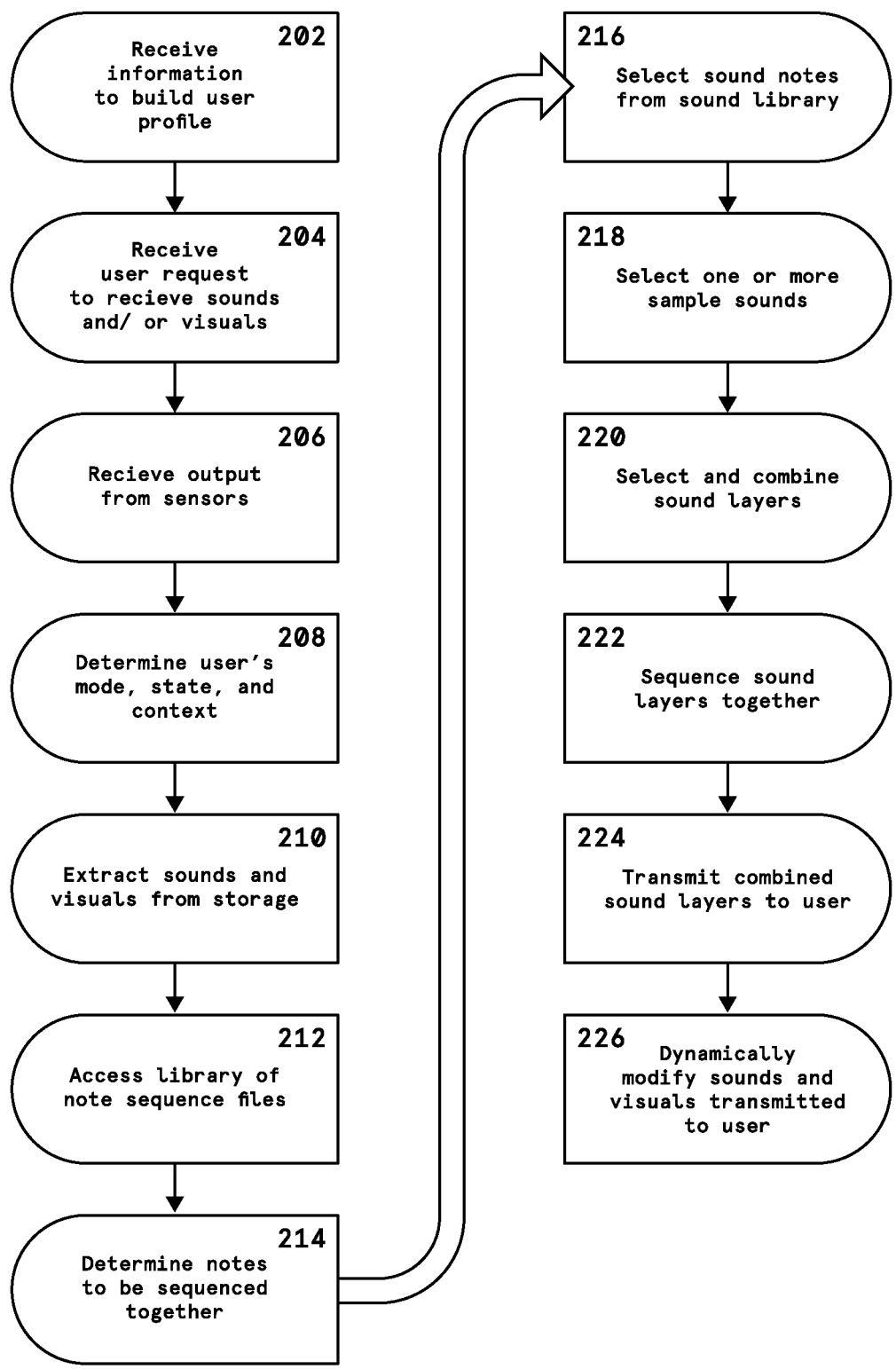
FIG. 2 is a flowchart illustrating the steps for creating a personalized sound environment for a user.
Figure 3:
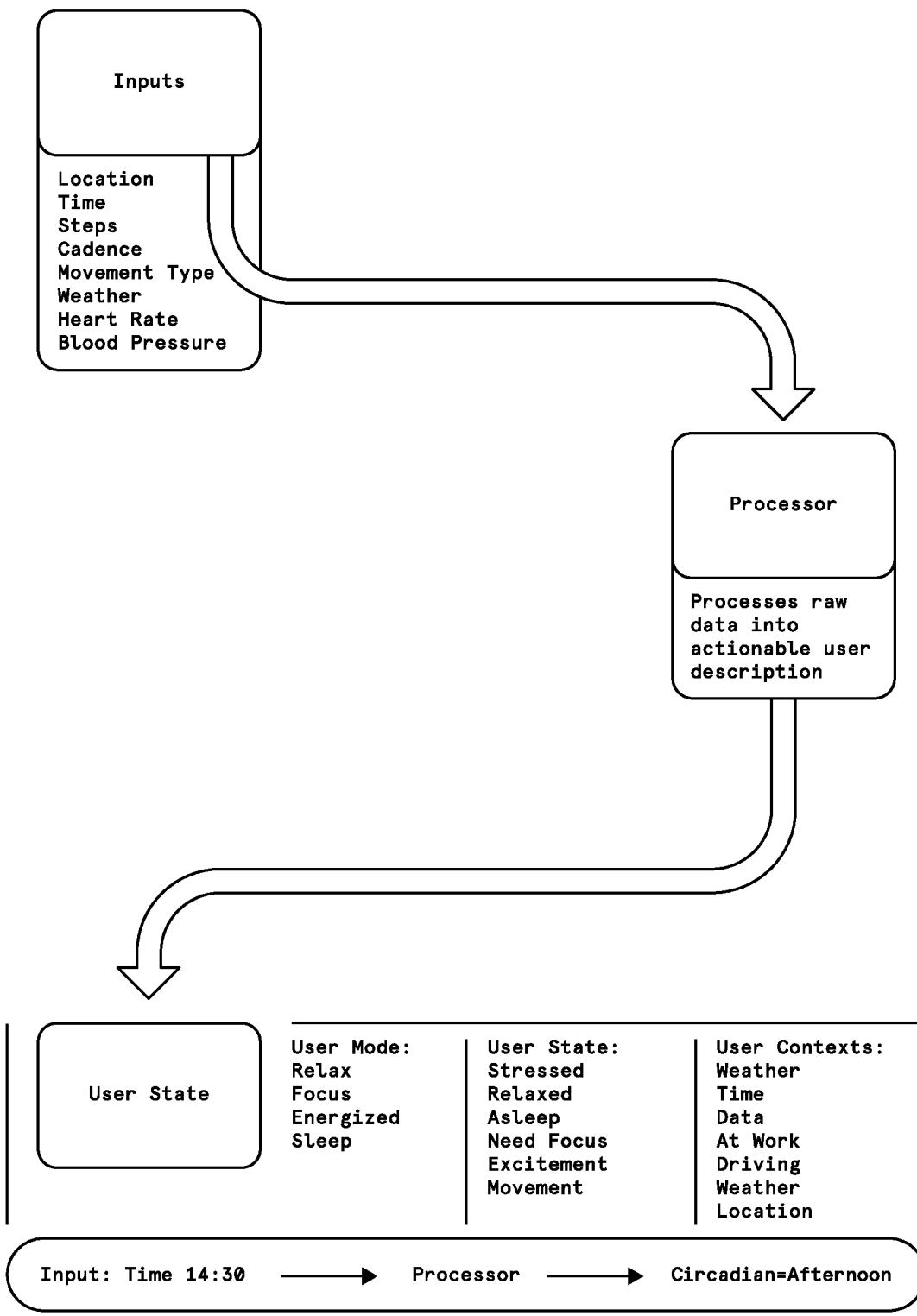
FIG. 3 is a flow diagram showing sensor inputs to a processor for processing raw input data for determining an actionable user description representative of a user's state.

Referring now to FIG. 2, depicted is a flowchart of a method for composing and presenting personalized sounds to a user, based on that user's environment and state. The present invention provides a method for creating a personalized environment to address a person's individual environment, mode or needed mode, state, and context, including receiving and analyzing sensor data representative of a user's environment and state and utilizing the analyzed data with libraries of sounds to compose and present to the user a dynamic, personalized stream of sounds. The sounds to be presented to the user are comprised of a created composition of notes, sounds, and instrument sounds in multiple combinations and layers. This sounds presentation is in contrast to presenting known music scores or a music playlist for user selection and/or listening. Hereinafter, the steps of this method will be described in detail.

At step 202, the application presents a number of questions and categories to the user to establish a user profile, the profile may include user preferences, such as related to music, genre, sound, activities, vocation, avocations, images, colors, and weather. The system builds a profile of the user based on the received user information in response to the questions and selected categories. The user can change the profile at will upon identified authorization.

At step 204, a request is received from the user to receive sounds from the system, based on the user's environment and state. The request can also indicate particular user-related environmental or state information, such as the user requesting sounds for a certain period of time and/or the user expressly requesting sounds to provide relax, focus, or activity modes for the user. Alternately, the user's profile can provide this information. Also, the user can establish a profile that instructs the system to automatically initiate presentation of sounds/at a particular time of day or day of the week, or upon determining a particular state of the user, such as a high heartrate or blood pressure, or prolonged driving.

At step 206, the application receives the outputs from sensors 112 and from the user; and from those outputs can determine an actionable description for the user. Such an actionable description includes a user mode, a user state, a user context, and a user physical environment. Based on the user's determined actionable description, the system can determine the user's status and can determine sounds to positively impact the user. The sensors 112 can provide location information, such as from a global positioning receiver (GPS) on the user's device 114. The received GPS information can be continual such that the system can determine whether the user is stationary, walking, running, or driving. With this information, the system can partially determine the sounds to present to the user. For example, a stationary state of the user suggests the user may be at work; and the system selects focus-related sounds for presentation. Similarly, if the user is determined to be walking or running, energizing (i.e., upbeat) sounds can be selected for presentation. Alternately, the user may have established a profile indicating that relaxing sounds are preferred for walking. If the user is determined to be driving, based on the speed and the path whereby the GPS signals are changing and by traffic information input, a combination of relaxing and focusing sounds/music can be selected for presentation. Further, the location information can determine to which channel or platform to transmit the sounds/to the user, such as the user's work computer, the user's mobile phone, or the user's home computer or smart speaker system. The system is adaptable to deliver personalized sounds to a user over a network or a cloud-based service regardless of where the user is located or moving toward. Parameters can be established to weight the relative importance and impact of the outputs from the sensors based on the user profile and preferences, perhaps, for example, giving more significance to heartrate and blood pressure for an older user.

The sensors 112 can also provide the physical information, such as the heartrate and/or the blood pressure, of the user. The heartrate information, coupled with other sensor data, helps the system determine the user's state and the user's changing state (such as when the heartrate increases or decreases). The system can compare the user's heartrate against a medical standard for persons of the user's profile, such as age, weight, and exercise regiment, or from an accumulated history of the user's heartrate. This comparison can suggest the user is more or less stressed, is engaged in more or less strenuous activity, is more or less relaxed; and the system can dynamically adjust the sounds presented to the user to relax the user, cause the user to better focus, to help energize the user, and to help the user fall asleep. Similarly, the user's blood pressure, if elevated compared to a standard or the user's history, can signal a stressful condition for which soothing or relaxed sounds should be presented.

Other sensors 112 provide weather data, knowing that high winds, excess temperatures (high or low), bright or diminished light, and rapidly changing barometric pressure can affect an individual's mood and stress level. In recognition of the environment in which the user is functioning, the system can provide sounds to counter the user's environmental effect, such as providing energizing sounds in response to low light.

Further sensors 112 provide data regarding the user's steps, cadence, and movement type. Such information helps determine what the user is doing, in addition to the more global GPS data. This information can help specifically determine whether the user is walking in a relaxed manner, rushing to get to an appointment on time, climbing stairs, sitting at a desk, or running. This information, coupled with time and date information from a clock sensor can help determine when the user is moving related to work, running in the morning or evening, or sitting at home relaxing. The various sensor information helps the system determine the environment in which the user is functioning and the state of the user—all performed dynamically without expressly asking the user to provide this information. The system responds to this information by automatically selecting sounds for improving the user's circumstance, by providing relaxing, motivating, energizing, on the go, etc. sounds.

The received sensor information can be stored in a storage device 106, 108, or 110, along with determined sounds presented to the user for a library of data for subsequent analysis and presentation to the user. For example, the stored heartrate data can be compared to the user's current heartrate to determine whether the user's current heartrate is elevated or low. Further, past presented sounds can be labeled for subsequent presentation under similar user states if the past presented sounds were designated at being successful as, for example, providing relaxing, motivating, soothing, or energizing sounds, as determined by subsequent user comment or behavior.

At step 208, an actional description of the user is determined based on the user input, the user profile, and the sensor outputs. The user's mode, state, and/or context is determined based on analysis of the received sensor information and, alternately, information in the user's profile. As discussed above, the analyzed sensor data and profile data can determine whether the user is stressed, is relaxed, is at work, is at home, is at the gym, needs to relax, needs to focus, needs to be energized, and so on. Additionally, the user can provide input to specify her state or context, can permit the system to provide sounds appropriate to her state or context, or can expressly request the type of sounds to be presented. The state of the user relates to mental and physical condition of the user, such as stressed, relaxed, asleep, running, needing to focus, and so on. The context of the user relates to the environment of the user, such as whether the user is at work, outside, or outside; what the weather is for the user, what the date and time of day is, and what is the lighting level and the temperature of the user's environment. The combined determined mode, state, and context of the user can be referred to as the user status.

Figure 4:
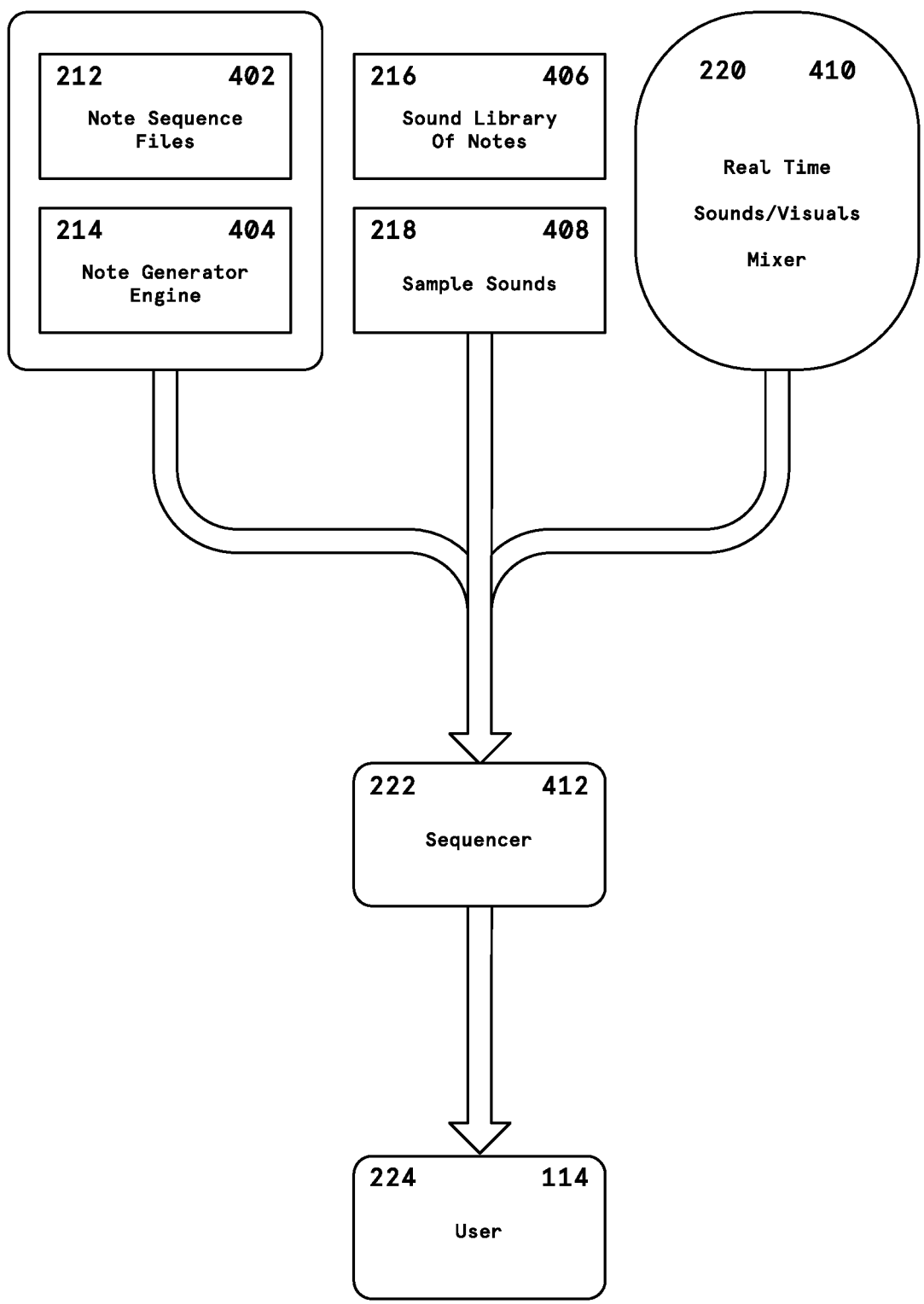
FIG. 4 is a flow diagram showing library inputs based on a determined user's state for sequencing sounds for presentation to the user.
Figure 5:
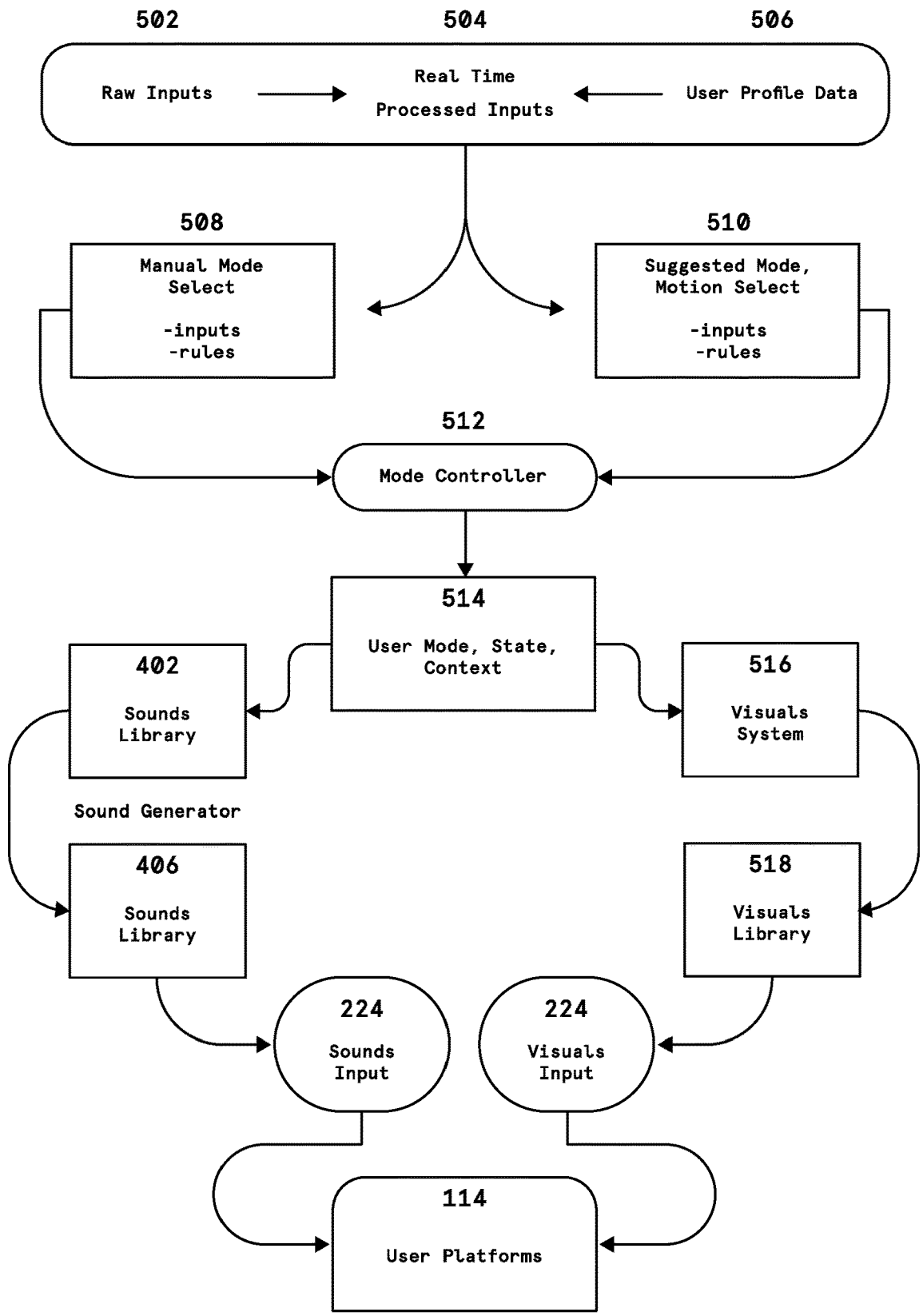
FIG. 5 shows the selection and flow of information for creating sound output for presentation to the user.

At step 210, based on the user's determined or specified status, the system extracts sounds from a storage library or libraries for creating sounds for presentation to the user, based on the user's profile and specified input. Referring also to FIGS. 4 and 5, and as explained above regarding step 202, raw inputs 502 are received from the user to be processed and create a user profile 506. From the user profile, user input, and/or the sensor information, a motion and mode of the user is determined, as shown at 510-514.

From this motion and mode, the sound engine composes a dynamic soundscape using a unique granular system in which smaller sound sections are sequenced together in order to create sound phases which define a particular user activity, user state and user model. These sound phases, in turn, may then compose much larger and dynamic soundscapes of indefinite length when the user's condition changes according to conditional rule sets.

Firstly, sounds sections comprising layered sounds allow for the control of sound development in a soundscape on a more granular scale. For example, small changes in a user's heart rate may subtly change the tempo. Sections are also responsible for structural composition and development within a phase, such as to allow for introductions, as well as body and bridge sound sections. For instance, introductions to a particular phase may comprise a single melody or progression of chords to garner the listener's attention and set the tone of the particular phase. A bridge may tie together two contrasting sections of a phase, whereas the phase body is generally a recurring section. Altogether, this creates a more homogenous soundscape adapted to a particular set of conditions. In the creation of these smaller sound sections, the system at step 212 accesses a library of note sequence files 402 divided by intensity. The note sequence files are random musical scores of note sequences, typically of 10-20 second duration that can be repeated continuously until the presentation is terminated by time, by a determined change user state or context, or by user request. The selected score(s) is selected or created by the software or firmware of the note generator engine 404, which also determines the sequence of the notes and the duration of the notes sequences, based on the determined user's state or context. At step 214, the note generator 404 additionally determines, based on rules and past successful presentations to the user, which notes can be sequenced together or one after another. For example, notes of extremely differing pitches, tone, or sound are not sequenced together to provide relaxing or soothing sounds; whereas such contrasts can be useful to provide energizing sounds. Based on which notes are known to work together under the rules and past presentations, the sound generator 404 can create sequences of up to 40 notes which can be presented repeatedly or can be re-sequenced to provide a presentation variety or in response to changing sensor information.

The third source of sounds is selected at step 216 from a sound library 406 comprised of raw audio files of single notes. Again, the determined state, context, and/or user profile will determine the particular notes. For example, notes at the lower end of the musical scale can be more soothing and are selected by the system for presenting soothing or relaxing sounds. The various notes in the musical scale can be chromatically mapped to instruments sounds for having available instrument sounds for each scaled note.

A fourth source of sounds is selected at step 218 from a library of sample sounds 408, based on the determined user state, context, and/or profile. These sample sounds can include sounds from nature, white noise sounds, vocals, sounds from musical instruments, etc. These sounds could be up to several minutes in duration, and again are selected based on the determined state, context, and/or user profile. For example, a trumpet sound can be selected for a more energized sound for presenting to a user who is running or needs motivation. The sounds from multiple samples can be selected for presentation to a user.

Figure 6:
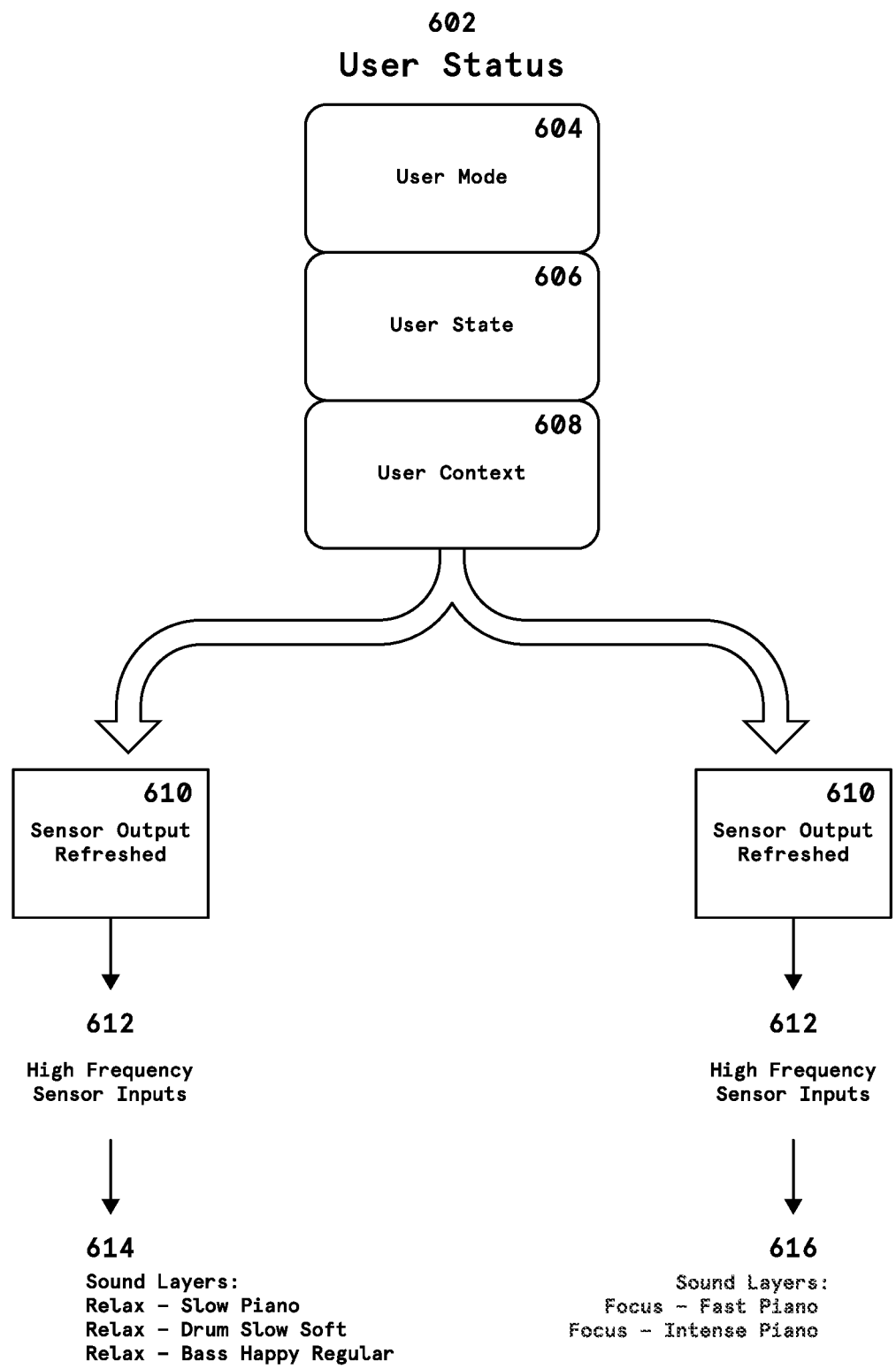
FIG. 6 shows a diagram of the sound layers that are responsive to a user's mode, state, and context.

Each of the note sequences and notes from steps 212-216 can be viewed as a layer of sounds which form the sound section, with one or more layers being presented to the user. Additional layers are available by applying the note sequences and notes from steps 212-216 to the selected instruments of step 218. At step 220, and also referring to FIGS. 6 and 7, particular sound layers 704 are selected and combined by a real time mixer 410 for presenting sounds to the user. The particular layers are selected based on a set of rules guiding the selection such that, as discussed above, the particular selected notes and instruments are appropriate for the determined user mode, state, user context, or user preferences and profile. Layers are also selected such that the layers of the combined output do not clash with each other in terms of tempo and intensity. The selected layers are sequenced together at step 222 for presentation to the user on the user device 114.

At step 224, the combined layers of sounds 520 are presented to the user for listening by the user. The system can also determine the volume by which the sounds are to be presented to the user. The user device 114 can include a microphone to detect a single sound, a combination of sounds, a combination of sounds and music, and a combination including human speech. For example, the microphone can be utilized to measure sound levels in the user's space and react to sudden volume changes, either raising or lowering the sounds volume to permit continued listening by the user. A detection of a new human voice can trigger a reduction in the sounds volume to permit the user to conduct a conversation without being distracted by the presented sounds.

Changes in user state, user environment and user mode underly shifts between phases. At step 226, the system dynamically determines that information received from one or more sensors has changed and warrants a change in the sounds being transmitted for presentation to the user. For example, the location of the user has changed, and the GPS data shows the user driving from her gym to her home. Accordingly, the system changes the sounds to be more focused and relaxed, to address the attention the user needs for traffic and for preparing for a relaxed time at home after working out. Steps 210-226 are performed automatically, without human input, based at least on the determined user state and context.

The aforementioned system and methods described above with respect to FIGS. 1-7 provide a layered approach to generating a soundscape particular to a user mode, user state, and user context. These particular soundscapes comprise sound phases. When a user mode, a user state and/or a user context changes, then the sound engine may shift the generated soundscape into a new or different phase. These phases may then be sequenced together to create a more adaptive, larger soundscape of indefinite length.

Figure 8:
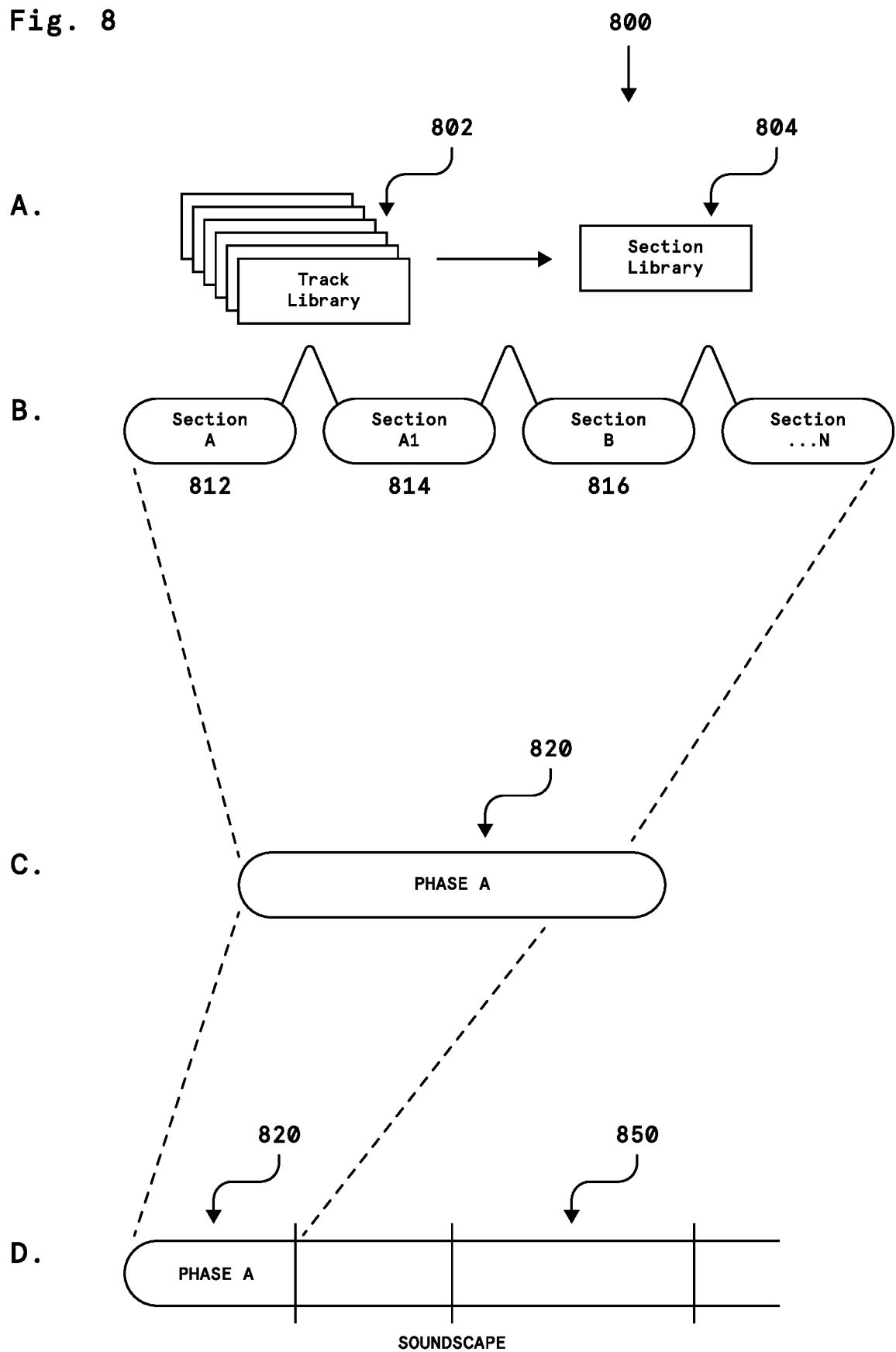
FIG. 8 illustrates an exemplary construction of a soundscape whereby soundscapes are comprised of phases, phases are comprised of sections, and sections are comprised of layers.

FIG. 8 is an example diagram 800 depicting the generation of a continuous music soundscape according to one or more aspects of the present disclosure. For example, in some cases, the diagram 800 can depict the generation of a continuous music soundscape using the granular approach(es) of automatic composition described above. In one illustrative example, one or more tracks of sound (e.g., from one or more track libraries such 802) can be layered on to one another in order to create one or more sound sections, shown here as sound sections 812-818. In some embodiments, one or more of the sound sections 812-818 can be generated as described above with respect to FIGS. 2-7. As illustrated, a section library 804 can additionally be provided, wherein section library 804 can be configured to store or otherwise provide one or more sound sections, including the sound sections 812-818.

Returning to FIG. 8, in some examples the same track library 802 (and/or the same section library 804) can be used to generate a plurality of sound sections 812, 814, 816, and 818, depicted as Section A, Section A1, Section B, . . . , Section N, respectively. In some embodiments, one or more of the plurality of sound sections 812-818 can contain a multiple of 16 beats and/or can be generally on the order of seconds in length.

One or more of the generated sound sections can subsequently be pieced together or otherwise combined to form one or more sound phases. For example, the generated sound sections 812-818 can be used to generate a sound phase 820, shown here as Phase A. In some embodiments, the generated sound phases can be on the order of minutes to hours in length, depending, for example, upon factors such as the change in phase condition. In turn, one or more of the generated sound phases may then be sequenced together into a soundscape 850, which may be on the order of several minutes to several hours in length or duration. For example, soundscape 850 includes the generated sound phase 820 and one or more additional generated sound phases (not shown). In some examples, the modularity of sound sections (such as sound sections 812-818) and sound phases (such as sound phase 820) can be used to improve the automatic composition and/or generation of a continuous soundscape (such as soundscape 850), as disclosed herein.

Sound sections (also referred to as "sections") have the smallest length or duration, e.g., the duration or runtime of a sound section (such as sound sections 812-818) is less than or equal to that of a sound phase (such as sound phase 820), which itself has a duration or runtime that is less than or equal to that of a soundscape (such as soundscape 850). Sound sections can be utilized to enable variability within a sound phase (also referred to as "phases"). For example, a sound engine can choose different rhythms, melodies, and/or patterns within sound sections in order to create a high intensity sound phase. Likewise, sound sections can enable reactivity and dynamism in the generated sounds and/or sound compositions, where different ones of the plurality of sound sections may be chosen or otherwise generated based on factors such as sensor input. In some embodiments, sensor input(s) can include, but are not limited to, measurements such as heart rate, breath rate, cadence, weather, time, etc. In some examples, sound phases can be used to further control the evolution and progress of or within a soundscape (such as soundscape 850) that is generated by the automatic composition systems and techniques described herein. In some embodiments, sound sections (such as the sound sections 812-818 and/or sound sections stored in track library 802 and/or section library 804) can be used as a basic, modular component of the automatic composition systems and techniques that are described herein.

Figure 9:
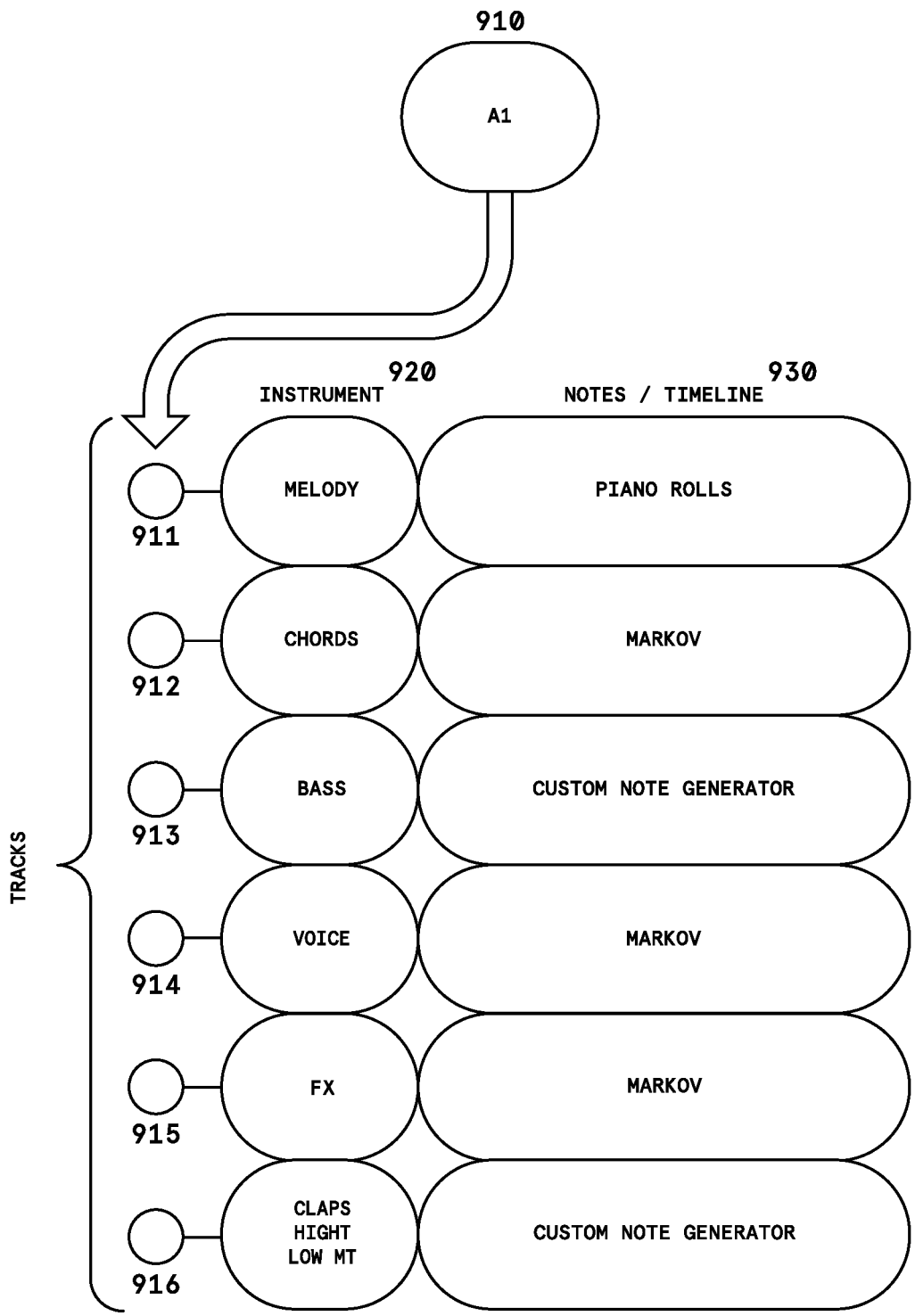
FIG. 9 illustrates an exemplary construction of a sound section by the overlaying of sound layers.

For example, FIG. 9 illustrates a sound section 910 (labeled as Section A1) comprising a plurality of tracks 911-916. In some embodiments, sound section 910 can be the same as or similar to the sound section 814 depicted in FIG. 8 and described above. Sound section 910 is shown as including six layered tracks 911-916, each associated with a type of instrument 920 and a type of timeline 930. However, it is noted that a greater or lesser number of layered tracks can also be utilized to generate sound section 910 without departing from the scope of the present disclosure. Additionally, it is appreciated that the constituent tracks and/or track types of sound section 910 can be different than the example track types 920,930 that are shown in the example of FIG. 9. Here, each of the track layers 911-916 comprises a different instrument 920 with respective notes/timelines 930. In some embodiments, the layered approach of FIG. 9 can be utilized to combine tracks that are composed using different generative techniques, as is described in greater depth below. Different types of generation (e.g., of constituent tracks of a sound section, of a note sequence, etc.) can be chosen or otherwise utilized based on factors such as an identified/determined soundscape genre, an intensity parameter, and/or a common musical appropriateness. For example, as will be explained in greater depth below, a musical appropriateness can be determined specific to or particular to a given user of the presently disclosed systems and techniques for automatic soundscape generation. In one illustrative example, musical appropriateness can be based at least in part on a user profile and/or one or more user preferences, indicating sound types (e.g., notes, rhythms, tempos, instruments, tracks, sections, phases, etc.) that are identified and/or determined to be appropriate (or non-appropriate) for the given user. In some embodiments, the user profile/user preferences can be provided at least in part as one or more user inputs, for example received via a setup wizard and/or one or more UI elements/prompts presented to a user. In some embodiments, the user profile/user preferences can be determined automatically by the presently disclosed systems and techniques, for example using one or more user inputs that can be analyzed to determine or infer at least a portion of the user profile/user preferences. As will be described in greater depth below, the user inputs that can be analyzed or otherwise used to infer user preferences and/or musical appropriateness can include (but are not limited to) user inputs to skip soundscapes generated in a shuffle or random mode; user inputs to a like and/or dislike button for presented soundscapes; user responses, skips, likes/dislikes, etc., provided in response to A-B testing and/or comparative testing using soundscapes generated to test user preferences or musical appropriateness, etc.

In some embodiments, one or more of the identified or determined soundscape genre and/or the intensity parameter can be user-specific, in a manner that is the same as or similar to as described above with respect to the musical appropriateness determination. For example, as will also be explained in greater depth below, soundscape generation can be based at least in part on one or more determinations of particular soundscape genres that are determined to be appropriate for a specific user, or are determined to otherwise be sufficiently aligned with the specific user's preferences (e.g., preferences inputted by the specific user or preferences automatically determined for the specific user).

In some cases, soundscape generation can be based at least in part on one or more determined intensity parameters that correspond to a specific user. For example, a specific user might have a musical/sound preference for low intensity, high intensity, a combination of the two, etc. In some embodiments, the one or more determined intensity parameters can be specific to particular combinations of other factors. For instance, it may be determined that the specific user preference is for low intensity sounds in a first set of soundscape genres and high intensity sounds in a second set of soundscape genres. In some embodiments, the systems and techniques described herein can automatically determine, modify, update, or otherwise adjust one or more user preferences in a multivariate manner (e.g., automatically determine user preference(s) for various soundscape genres, and further determine user preference(s) for intensity parameters and/or musical appropriateness within each of the determined soundscape genres)

Returning now to the discussion of FIG. 9, as illustrated for sound section A1 (910), Track 1 (911) is a melody with piano rolls, comprising individual notes played in succession. Track 2 (912) is composed of chords, a group of notes sounded together with or based on a Markov timeline, e.g., determined using a Markov process. Track 4 (914), comprising voice notes, and Track 5 (915), comprising FX (e.g., sound effect) notes, are both additionally shown as having timelines 930 that are determined by a Markov process. Track 3 (913) is composed of bass notes, e.g., a group of bass notes sounded together in a sequence or arrangement that is determined using a custom note generator, according to aspects of the present disclosure. In some examples, a custom note generator according to aspects of the present disclosure can include, be based on, or otherwise implement a stochastic approach, among others. For instance, in some examples, tracks having a stochastic timeline can be those tracks whose note sequences are generated by a stochastic process other than a Markov process.

A Markov timeline is a stochastic model describing a sequence of possible events in which the probability of each event depends only on the state attained in the previous event. In some examples, rules can be defined by which notes can be played after each particular note. In some embodiments, one or more rules indicating permissible pairs of successive note pairs (or permissible note sequences of three or more notes) can be determined based at least in part on an automatic determination of user preferences. In one illustrative example, the permissible pairs or sequences of notes can be determined for a specific user, based on analyzing user feedback and/or user input(s) obtained from the specific user. For example, the permissible pairs or sequences of notes can be included in the automatic determination of musical appropriateness previously described above.

In some embodiments, the systems and techniques described herein for automatic soundscape generation can determine these rules (and/or the permissible pairs and sequences of individual notes) using a learning or evolving adaptation process that is automatically performed for specific users. In the context of combinatorial note rules and/or permissible note pairs and note sequences, the automatic learning or evolving adaptation process can be based at least in part on analyzing a plurality of user inputs that are provided by the specific user in response to the presentation of various automatically generated soundscapes.

For example, if a user presses a 'skip' or 'next' button partway through the presentation of an automatically generated soundscape, it may be inferred that one or more aspects in the skipped soundscape are unpleasant to the user or otherwise do not correspond to the specific user's sound preferences. In some embodiments, the systems and techniques described herein can include one or more user interface elements that allow a user to provide specific feedback indicating a like or dislike of a currently presented automatically generated soundscape. In such a scenario, an automatically generated soundscape that is currently being presented to the user can be skipped in response to receiving a 'dislike' user input.

In general, a single user input (e.g., a 'like,' a 'dislike,' or a skip) received in association with an automatically generated soundscape may not be sufficient to determine or infer specific user preferences. For example, a user might skip a soundscape by accident, in which case it can be improper to use the skipped soundscape to determine or infer the user's preferences. A user might also skip a soundscape arbitrarily, or because the user is not in the mood to listen to the soundscape—again, it can be improper to use the skipped soundscape to determine or infer the user's preferences in these cases. In some examples, a user might intentionally skip or 'dislike' an automatically generated soundscape because the soundscape contains multiple different auditory elements that are not aligned with the user's preferences—in this case, it would be proper to determine or infer the user's preferences from the provided user feedback. However, a single skip, 'dislike,' 'like,' or other instance of user feedback associated with an automatically generated soundscape provides a single point—from which it can be difficult to identify the specific auditory elements (e.g., out of the set of all auditory elements present in the soundscape) that triggered the user feedback and/or that should be used to determine or update the user's preferences.

Accordingly, in one illustrative example, the systems and techniques described herein can automatically collect and compile a plurality of user preference and/or user feedback data points and use the aggregate set to automatically determine or otherwise update a specific user's soundscape generation and/or auditory preferences. For example, by analyzing the aggregate set of user feedback information obtained for a specific user, the systems and techniques described herein can more accurately determine or otherwise infer user preferences and other trend information to better guide the automatic generation of soundscapes particular to that specific user, as will be explained in greater depth below.

The collected user preference and user feedback data points can include, but are not limited to, the previously described user inputs of a 'like,' 'dislike,' or skip of an automatically generated soundscape that was presented to the user. In some embodiments, the collected user preference and feedback data points can be associated with an identifier of the corresponding soundscape to which they pertain. Additionally, or alternatively, the collected user preference and feedback data points can be associated with one or more tags or features included in the corresponding soundscape.

For example, user feedback comprising a 'dislike' or a skip of a soundscape can be stored in combination with or otherwise associated with a list or a set of features that were included in the soundscape. The features can have various granularity levels, such that a feature can be associated with a constituent note, track, section, and/or phase of the soundscape. In some embodiments, one or more features can have a granularity that associates the feature(s) with the overall soundscape as a whole. The features can include an identification or categorization of the constituent notes, tracks, sections, and/or phases of the soundscape. In some embodiments, the features can specify a sequence order of some or all of the constituent notes, tracks, sections, and/or phases of the soundscape. The features can also indicate or specify one or more types of instruments, melodies, chords, sound effects, intensities, etc., that are present within the soundscape or are otherwise associated with one or more constituent components of the soundscape (e.g., notes, tracks, sections, and/or phases).

In some embodiments, one or more of the features or tags can be pre-determined, e.g., stored in association with the sound element (e.g., note, track, section, phase, etc.) to which the feature or tag is applied. One or more of the features or tags can additionally, or alternatively, be automatically generated by the systems and techniques described herein.

As contemplated herein, sound features can be used in combination with various forms of user feedback and/or user preference information to drive a learning or evolving adaptation process that is automatically performed for specific users. For example, an aggregate set of user feedback received from a specific user can be analyzed to identify one or more common sound features across the aggregate set, and a determination can be made correlating an identified common sound feature to one or more user sound preferences (and/or can be used to adjust one or more user sound preferences). For example, if 95% of the soundscapes disliked or skipped by a user contain nature sounds, it can be determined with a relatively high confidence level that the user's sound preferences do not (or should not) include nature sounds.

In one illustrative example, negative user preferences (e.g., disliking nature sounds) can be cross-referenced and analyzed against affirmative user preferences, and vice versa. For example, continuing in the example above in which 95% of the soundscapes disliked or skipped by a user contain nature sounds, the confidence level of the determination that the user's sound preferences do not include nature sounds can be increased even further by analyzing the user's 'liked' soundscapes for the absence of nature sounds. If none (or a relatively small percentage) of the user's liked soundscapes contain nature sounds, it can be determined at an even higher confidence level that the user's sound preferences do not (or should not) include nature sounds.

In this manner, the systems and techniques described herein can automatically determine affirmative and negative user sound preferences (and use the determined sound preferences to drive a learning or evolving adaptation process for generating soundscapes for that user). For example, affirmative user sound preferences (e.g., sound features that the user enjoys/are appropriate for inclusion in automatic soundscapes generated for the user) can be determined from the presence of certain sound features in 'liked' soundscapes and/or from the absence of certain sound features in 'disliked' or 'skip' soundscapes. Negative user sound preferences (e.g., sound features that the user does not enjoy/are not appropriate for inclusion in automatic soundscapes generated for the user) can be determined from the presence of certain sound features in 'disliked' or 'skip' soundscapes and/or from the absence of certain sound features in 'liked' soundscapes.

In some embodiments, the greater the commonality of an identified sound feature within the set, the greater the confidence level that may be associated with a user preference determination made with respect to the identified sound feature. For example, the aggregate set of user feedback can be sub-divided based on the type of user feedback represented (e.g., the aggregate set can be divided into a subset comprising 'dislike' user feedback data points, a subset comprising 'like' user feedback data points, a subset comprising 'skip' user feedback data points, a subset comprising 'dislike' and 'skip' user feedback data points, etc.).

Confidence levels can be represented as weights or probabilities associated with sound features. For example, if the sound feature is a particular melody, rhythm, or instrument, a user preference for the sound feature can be determined with some confidence level (e.g., as described above). The confidence level can be a probability that the sound feature will be included in an automatically generated soundscape. For example, if it is determined at a 90% confidence level that a user has an affirmative preference for piano notes, then the systems and techniques described herein can generate automatic soundscapes for that user with an approximately 90% probability that piano notes are included in any given automatically generated soundscape. In another example, if it is determined at a 90% confidence level that a user has a negative preference for trumpet notes, then the systems and techniques described herein can generate automatic soundscapes for the user with an approximately 90% chance that trumpet notes are not included (conversely, with a 10% chance that trumpet notes are included).

It is noted that while, in some embodiments, confidence levels may be used as an approximately direct representation of the weight/probability assigned to a sound feature, it is also contemplated that confidence levels can be used as one of multiple inputs to a calculation of an ultimate weight/probability assigned to a sound feature. In other words, a 90% confidence level that a user has an affirmative preference for piano notes may not always translate to a 90% probability that piano notes are included, and for example could instead translate to a 70% probability that piano notes are included. However, the same general trend can be observed regardless of whether confidence levels are directly or indirectly translated into sound feature weights/probabilities, e.g., a 90% confidence level will result in a higher final weight/probability than a 40% confidence level.

In one illustrative example, the determined user preferences for sound features (and the associated confidence levels) can be used to dynamically update or otherwise change an existing weight/probability assigned to a sound feature, as mentioned above. In this manner, the systems and techniques described herein can use the determined sound preferences to drive a learning or evolving adaptation process for automatically generating soundscapes for specific users. Accordingly, in some embodiments, a plurality of sound features can be associated with an initial starting weight/probability of inclusion in an automatically generated soundscape. The initial or starting weights can be uniform (e.g., all sound features have an equal probability of inclusion). In some cases, the initial or starting weights can be non-uniform (e.g., some sound features have a higher probability of inclusion than others, and vice versa).

In some embodiments, at least a portion of the initial or starting weights assigned to the sound features can be determined using feedback and/or preference information that was previously collected or determined for other users. For example, the initial starting weights assigned to the sound features can be determined as the average sound feature weights as calculated over an entire user base of the presently disclosed systems and techniques for automatic generation of personalized soundscapes. In some embodiments, the initial starting weights can be calculated as the average sound feature weights over some subset of users. For example, the subset of users can include, but is not limited to: users with similar demographic information to the current/specific user (e.g., age, sex, gender, location, profession or occupation, etc.); users located in the same geographic area as the current/specific user (e.g., country, state/region, city, town, etc.); users with the same or similar computing device or computing device information as the current/specific user; etc.

By analyzing information of or associated with the current/specific user to identify a subset of other similar users that share the same attribute(s), in some embodiments a more accurate set of initial sound feature preference weights can be determined and configured for the current/specific user (e.g., by taking the average sound feature preference weights over the subset of identified similar users). In some embodiments, one or more sets of initial sound feature preference weights can be pre-determined and associated with relevant demographic information and/or other user attributes that are associated with or otherwise represented by a given one of the pre-determined sets of pre-determined sound feature preference weights. In some scenarios, no demographic or other user attribute information may be available, in which case a pre-determined or default set of initial sound feature preference weights can still be utilized. The default set of initial sound feature preference weights can include one or more non-uniform weights.

As described above, user feedback information can be obtained via one or more user interface elements such as a 'like,' 'dislike,' and/or 'skip' chosen by a user in the normal course of operation (e.g., during the normal presentation of soundscapes). In some embodiments, user feedback information can additionally (or alternatively) be collected in response to a shuffle mode in which randomized (or partially randomized) soundscapes are automatically generated and presented to the user. The soundscapes generated during the shuffle/randomized mode can exhibit a greater variance of sound features that are included, and therefore, in some cases can be used to obtain user feedback data points that permit a more accurate and/or efficient determination and characterization of the user's sound feature preferences. For instance, in a 'normal' mode (or other mode that is not the shuffle mode), automatic soundscape generation may be more tightly constrained to produce soundscapes that are known to be perceived as pleasant or preferred by a specific user. For example, in a 'sleep' mode, the systems and techniques described herein may be configured to generate sleep soundscapes using known user preferences, such that sound features that are known to be preferred by the user are disproportionately emphasized (e.g., have a greater weight and higher probability of inclusion) while sound features that are known to be non-preferred by the user are disproportionately de-emphasized (e.g., have a lower weight and lower probability of inclusion).

In other words, in some embodiments the various 'normal' modes of the automatic soundscape generation described herein can be expected to produce soundscapes that the user will 'like' in a substantial majority of instances, which can make it difficult to accurately and efficiently characterize or update the user's sound preferences (e.g., because the user is unlikely to be presented with any sound features that were previously identified as disfavored, and/or is unlikely to be presented with any sound features for which user-specific preference information is unavailable or has not been determined). Accordingly, the use of a shuffle or randomization mode can explore user preferences and collect feedback regarding various sound features (and combinations thereof) that may not typically be presented in the soundscapes generated for a specific user. As mentioned previously, this can be beneficial for determining user preferences for sound features that do not yet have any user-specific preference information (e.g., because the sound feature has never or rarely been presented to the user).

The use of a shuffle or randomization mode can additionally be beneficial for determining whether (and to what extent) user preferences may have changed or evolved over time. For example, a user may have previously expressed a strong dislike (e.g., negative preference) for nature sounds in their soundscapes, which would cause nature sounds to be entirely (or almost entirely) omitted from the soundscapes generated for that specific user. In some cases, the resulting negative preference for nature sounds may prove inaccurate (or less accurate) with the continual passage of time—several months or a year later, the user's preferences may have changed to the point that he or she now actively enjoys or prefers nature sounds. However, because the user previously indicated a strong dislike or negative preference for nature sounds, the soundscape generator described herein would have ceased to include nature sounds in the soundscapes generated for that user, thereby eliminating any opportunities (in the course of normal operation) to present the user with nature sounds and receive a 'like' or other positive feedback that would allow the system to determine that the user's preference for nature sounds is shifting from negative to positive.

Accordingly, in some embodiments, the shuffle or randomization mode contemplated herein can generate shuffled/randomized soundscapes that prioritize or otherwise emphasize the inclusion of sound features for which no user-specific preference information has yet been determined and/or sound features for which the user had previously expressed a negative preference. In some cases, a pre-determined time interval can be configured to specify a minimum amount of elapsed time before a sound feature for which a negative user preference was determined will be included in a shuffled/randomized soundscape (e.g., 6 months or one year).

The process of collecting and analyzing user feedback information to determine or update user preferences based on the shuffled/randomized soundscapes can then proceed in a same or similar manner as was described previously above. In some embodiments, confirmatory user preference information determined from shuffled/randomized soundscapes can be given an even greater weight. For example, consider a scenario in which the soundscape generator described herein had previously (e.g., in the normal course of operation) determined that the user holds a negative preference for nature sounds, and later (e.g., after 6 months or some other pre-determined 'cool-down' period) presents the user with a shuffled/randomized soundscape that includes multiple nature sounds or nature sound features. If the user once again provides feedback indicating a negative preference for nature sounds (e.g., selection of a 'dislike' or 'skip' UI option), this can comprise confirmatory user preference information that is given an even stronger weight when updating the user's sound feature preferences. In other words, if it is initially determined that the user dislikes nature sounds in their soundscapes, and it is then later confirmed that the user still dislikes nature sounds in their soundscapes, then nature sounds can be given a near-zero weight (e.g., probability of inclusion) or can be removed entirely from the soundscapes generated for that user in the future.

In some embodiments, shuffle mode can be activated in response to a user input or user selection of a shuffle mode option. In some cases, the systems and techniques described herein can automatically prompt a user to engage shuffle mode, e.g., if it is determined that the user has not recently used shuffle mode and/or that an insufficient amount of user feedback information has been collected recently.

In some embodiments, an A-B testing mode can be provided by the systems and techniques described herein, in which a first soundscape (referred to as 'Option A') and a second soundscape (referred to as 'Option B') are generated in combination and successively presented to the user in order to obtain user feedback information for each of the two options. In some cases, the A-B testing mode can be provided in addition to, or alternative to, the shuffle mode described above. In some instances, the A-B testing mode described below can be integrated into the shuffle mode, either wholly or partially. In general, the A-B testing mode can generate the two soundscapes Option A and Option B in a controlled manner, such that they are the same or similar across many dimensions of sound features but differ along one or more sound feature dimensions of interest. By collecting and comparing user feedback provided for Option A and Option B, the system can determine or infer one or more user preferences with respect to the sound feature dimension(s) of interest. For example, Option A can both be a relaxing sleep soundscape, with the same melodies and rhythms, but Option A includes soft percussion instruments and Option B includes soft wind instruments. By controlling the dimensions of sound features included in Option A and Option B other than one choice of instrument (e.g., the soft percussion instruments v. the soft wind instruments), the comparative analysis of the user feedback received for Option A and Option B when presented in the A-B testing mode can be used to determine a user preference, either affirmative or negative, for both the soft percussion instruments and the soft wind instruments.

For instance, after being presented both the Option A soundscape and the Option B soundscape, the user can be prompted to provide feedback indicating which of the two options the user preferred. In some embodiments, the user can be prompted to provide feedback indicating a preference level or preference strength for each of the two options (e.g., on. 1-10 scale, or a strong dislike to strong like scale, etc.). The comparative analysis of the user feedback on the A-B testing soundscape options can be used to determine or otherwise update a relative preference distance between the sound feature dimension(s) that are the focus/object of interest of the A-B test, and the user preferences for the tested sound features can be updated based on the determined relative preference distance. In other words, the A-B testing in some cases might not be used to determine absolute user preference values for sound features but can be used to refine or adjust the relative preference distance between sound features.

For instance, if in the example above the user indicated that they prefer Option A (with soft percussion instruments) over Option B (with soft wind instruments), then a relative amount of separation (e.g., a preference separation distance) can be determined between the user's preference for a percussion instrument sound feature and the user's preference for a wind instrument sound feature. The absolute preference values for percussion and wind instruments can then be updated based on this determination of the relative amount of preference separation. In one example, a value of the preferred sound feature (e.g., percussion instruments) can be increased by an amount based on the relative preference separation, while the non-preferred sound feature (e.g., wind instruments) is kept the same. In some examples, the value of the preferred sound feature (e.g., percussion instruments) can be kept the same while the value of the non-preferred sound feature (e.g., wind instruments) is decreased by an amount based on the relative preference separation. In another example, the value of the preferred sound feature (e.g., percussion instruments) can be increased by a first amount while the value of the non-preferred sound feature (e.g., wind instruments) is decreased by a second amount, wherein the first and second amounts are determined based on the relative preference separation between the preferred and non-preferred sound features.

The above example is presented for purposes of illustration. In some embodiments, it is contemplated that A-B testing can be conducted in multiple instances, to obtain an aggregate set comprising multiple user feedback data points from the A-B testing, such that the aggregate A-B testing user feedback data points can be analyzed to determine user preference information in much the same or similar manner as has been described previously above. In some embodiments, A-B testing can be conducted over multiple sessions or instances to increase the accuracy and reliability of user preference determinations and/or inferences made based on the resulting user feedback data from the A-B testing—by conducting multiple A-B tests over time, this can provide the user with the option to change his or her mind and/or can otherwise account for normal/expected variations in user mood, preferences, responses, etc. In other words, conducting multiple rounds of A-B testing over time can result in an aggregate set of user feedback data points that provide a more statistically relevant or representative characterization of the user's sound preference features.

The succession of notes, chords, etc. are ultimately determined then by these rule sets and randomness in order to create a unique composition. In some embodiments, a Markov timeline can be a generative sequence of notes that is created with a Markov chain and a probability matrix. The probability matrix and/or the note transition rules can, in some cases, be pre-determined according to preference. In some embodiments, the Markov probability matrix and/or rules can be automatically generated and updated by a learning and evolving system, wherein reference sets of notes are provided as a learning (e.g., training) data input. Based on the reference sets of notes, the learned Markov generation system can produce new and similar note sequences for use in automatically composed soundscapes of the present disclosure. In some examples, re-training or re-learning can be performed on a periodic basis, e.g., to either better adapt to the personal preferences of a particular user and/or to match the evolution of a user's preferences over time. In some cases, a small degree of randomization can be injected into the sound generation and composition process on a session-by-session basis.

In an illustrative example, the "Custom Note Generator" timeline type (e.g., the type of timeline 930 associated with layered track 3 (913)) can be applied to tracks that are generated using one or more of the processes of the present disclosure, for example tracks that are generated via the sound and note generator 404 described previously with respect to FIG. 4. In some embodiments, a stochastic method can be used in which notes, special effects, percussion, etc. are chosen at random.

The sound system described herein is dynamic in that it continues to receive sensor data and user input to automatically adjust the sounds presented to the user (and/or to adjust control signals transmitted) as the sensor data and/or user input change. In some embodiments, the system can continuously receive output from the sensors, store the sensor output, and compare the recently received sensor output against prior stored sensor output, sensor by sensor. If the output for a particular sensor has changed significantly for that particular sensor, the system can compare the degree and direction of change against its rules. In one illustrative example, the system can compare the change against the user's profile and preferences.

If the sensor output has changed to the extent to warrant changes to the sounds and/or soundscape to be presented to the user, the system can update its output and transmit modified sounds and/or soundscape. For example, if the system determines from one or more sensor outputs that the user's heartrate is increasing while the user remains stationary, this can suggest the user is becoming more stressed, and the system may automatically begin composing and presenting more relaxing sounds. Similarly, the user's GPS signals indicating the user is no longer driving and has arrived at home or at a gym can be taken to suggest that relaxing sounds be presented (relaxing at home) or that energizing sounds be presented (working out at the gym).

In some embodiments, different confidence levels can be associated with the correlation between a certain parameter or sensor input/sensed value and a corresponding user state. For example, an increased user heart rate, viewed in isolation, may be considered a low confidence indicator, as it could potentially be correlated with multiple different user states (e.g., an increased heart rate could correlate with stress, but an increased heart rate could also correlate with excitement, happiness, exercising, fright, etc.). In some embodiments, one or more of the different confidence levels can be the same as or similar to the confidence levels previously described above with respect to the automatic determination and/or updating of user sound feature preferences.

Accordingly, in some embodiments multiple parameters and/or sensor inputs can be used in combination to achieve a higher confidence level determination, e.g., sufficient to infer or estimate a user state that will trigger the automatic soundscape composer system to react or otherwise modify the current sound generation approach. Pairs or sets of parameters used to obtain a higher confidence level determination of a correlated user state can, in some examples, be pre-defined and/or can be learned and evolve with time. In some examples, input data from the one or more sensors can be analyzed or pre-processed to make an initial determination of the reliability of the input data—input data determined to be of low reliability can trigger the application of a stricter confidence level standard, e.g., requiring an increased number of sensor inputs (in comparison to a baseline number) to indicate the same correlation before a change in user state can be inferred.

Figure 10:
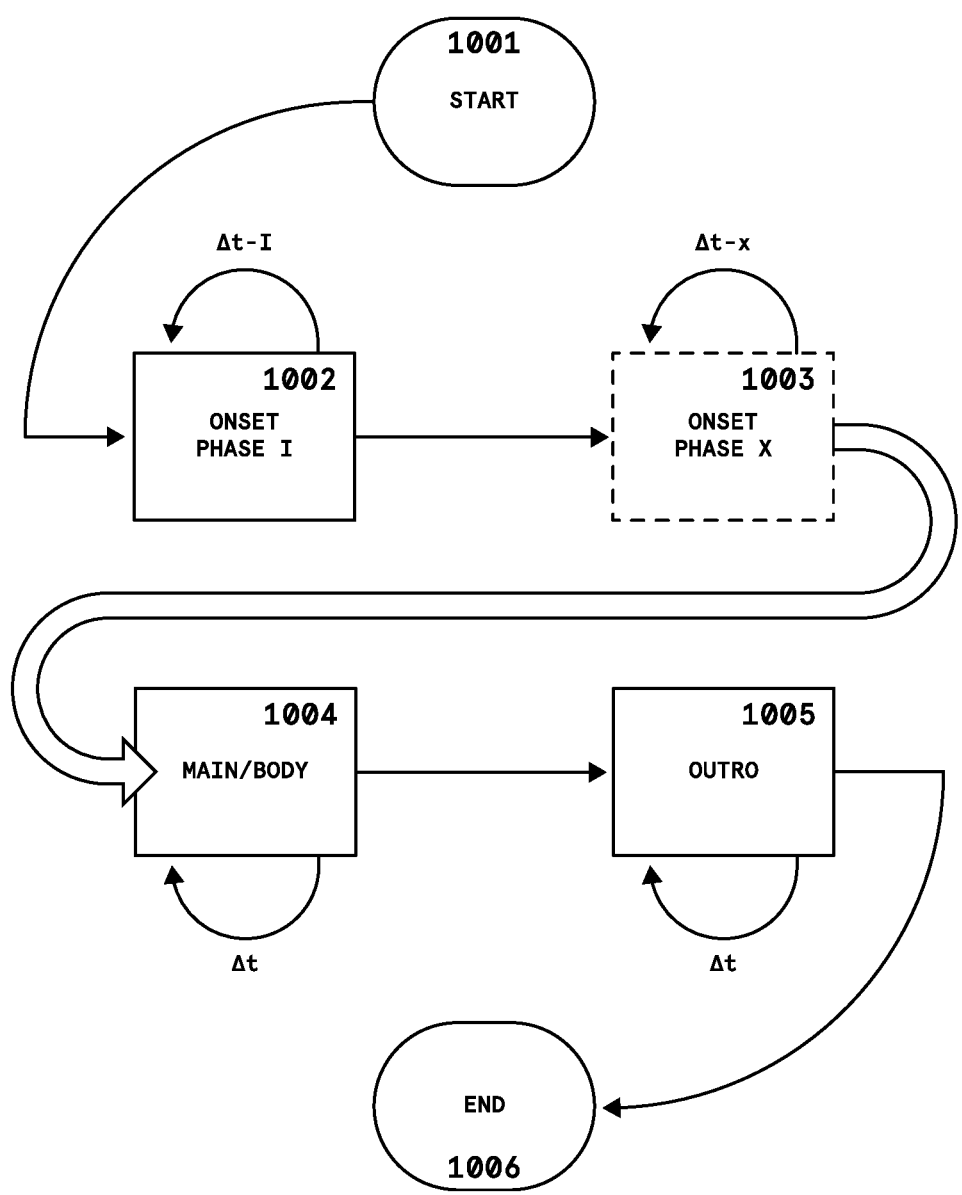
FIG. 10 illustrates an exemplary soundscape composed of various phases.

FIG. 10 illustrates an example construction of a soundscape comprising a plurality of sound phases sequenced together with varying characteristics. In particular, FIG. 10 depicts an example construction 1000 (also referred to as a "template" or "soundscape template") of a sleep soundscape, e.g., which might be utilized by a user who is going to sleep. In some examples, the sleep soundscape can be generated and provided to the user automatically by the systems and techniques described herein. For example, the sleep soundscape can be generated and provided based on an automatic determination made based at least in part on one or more sensor inputs. In some examples, the sleep soundscape can be generated and provided to the user based on a pre-determined start time, a user routine, a user-defined trigger, a user input, etc. As illustrated, the example sleep soundscape construction of FIG. 10 includes a linear progression of phases, e.g., without branching paths or options in which a choice is made between two or more subsequent phases when transitioning out of the current phase. In some embodiments, sleep soundscape constructions (and/or various other soundscape constructions contemplated herein) can utilize a non-linear progression of phases, or a combination or linear and non-linear phase progressions.

In some embodiments, soundscape construction can begin based on an initial template that defines one or more phases, e.g., the example template/high-level construction of FIG. 10. The phases can be defined by the template in a detailed or complete manner (e.g., specifying particular contents or components to include in given phases). In some embodiments, the phases can be defined by the template at only a high level, e.g., by specifying the purpose of the phase or type of the phase, which the soundscape construction system described herein can then use as an input to automatically generate the appropriate phases itself, without any further reliance on the soundscape template. In some examples, a soundscape construction template can include one or more rules within each phase, to further control the operation of the soundscape generator over a set of available audio inputs or building blocks (e.g., provided by or obtained from track libraries such as track library 802 of FIG. 8, section libraries such as section library 804 of FIG. 8, etc.).

The one or more rules (and/or the constituent phases themselves that are contained within the template) can, in some cases, depend on one or more sensor inputs. For example, the template can specify a subset of sensor inputs (e.g., a subset of all available sensor inputs) that should be used. In one illustrative example, the template can specify one or more different weightings or prioritizations that should be applied. For instance, the template can specify different weights or weighting factors that are to be applied to specific sensor inputs when generating a given phase(s) of the overall soundscape associated with the template. In some embodiments, one or more of the phase rules can operate on inputs received from a randomization process, e.g., instead of operating on sensor inputs or in addition to operating on sensor inputs.

For instance, as illustrated in FIG. 10, a soundscape may start 1001 with a first intro/onset phase 1002, which in some embodiments can be followed by one or more subsequent intro/onset phases 1003. The intro/onset phase(s) 1002, 1003 can be sections with reduced complexity (i.e., sections with fewer sound layers). One or more of these phases may be repeated for a duration Δt until the main body 1004 of the soundscape is reached. For example, the first onset phase 1002 can have a duration I and can be repeated Δt/I times before the soundscape proceeds to the subsequent onset phase(s) 1003. Similarly, the subsequent onset phase(s) 1003 can have a duration X and can be repeated Δt/X times before the soundscape proceeds to or otherwise reaches the next phase (e.g., the main body 1404 of the soundscape).

The main body 1004 can include a phase that is more structured. For example, the main body phase 1004 can include or comprise one or more sections having, for instance, faster tempos, more complex layers, and/or a more pronounced response to sensor input(s). Sound sections that have a more pronounced response to sensor input can have a faster response time and/or a larger response magnitude to the sensor input.

As illustrated, main body phase 1004 is then followed by an outro phase 1005 of length Δt. In some examples, outro phase 1005 can include less layered complexity in one or more of its constituent sound sections and/or can include more fade out characteristics, to end 1006 the soundscape. In some cases, outro phase 1005 can be similar (or otherwise generated using similar soundscape construction rules) to one or more of the intro phases 1002, 1003.

In some embodiments, one or more rules and/or selection triggers can be used to select the constituent sound section elements for inclusion in the currently played/generated phase (e.g., one or more, or all, of the sound section elements included in the phases of a soundscape, such as the phases 1002-1005 of the example soundscape of FIG. 10).

As mentioned previously, in some cases the rules and/or selection triggers can initially be pre-defined in the soundscape construction template (e.g., such as the soundscape construction template of FIG. 10) before subsequently evolving or otherwise undergoing a personalized adaptation to specific user data. For example, in some embodiments the personalization adaptation to specific user data can be the same as or similar to the automatic determination and/or updating of user-specific sound feature preferences as previously described above. In some cases, a user profile and/or one or more user data stores can be utilized to perform the personalized adaptation of the initial selection triggers provided in the soundscape construction template.

In one illustrative example, different heart rate BPM values can be used to implement the same type of condition threshold for different users. For example, a condition threshold might specify that the sleep soundscape of FIG. 10 will be triggered to transition from the main/body phase 1004 to the outro phase 1005 once the user's heart rate is sensed as falling below a certain threshold BPM. An initial selection trigger provided in the sleep soundscape construction template of FIG. 10 can set the threshold BPM to an initial value determined as an average sleep BPM threshold calculated for all users, as a pre-determined value, as an average sleep BPM threshold calculated for users with similar demographic information as the current user, etc. Long-term user data (e.g., of a specific user) can be measured and analyzed to determine a more personalized sleep BPM threshold for that specific user, e.g., because the specific user might tend to have a higher or lower heart rate than the average population and/or other users with same or similar demographic data as the specific user. Therefore, based on the analysis of the specific user's long-term sensor data, a personalized adaptation can be performed (and in some embodiments, continuously refined with the progression of time) to calculate and use a personalized sleep BPM threshold value to trigger the transition from main/body phase 1004 to outro phase 1005.

In some embodiments, one or more of the phases 1002-1005 depicted as part of the example sleep soundscape construction template of FIG. 10 can include one or more pre-determined sound sections (recalling that each phase can be generated from one or more sound sections, e.g., as illustrated in FIG. 8). In some examples, the pre-determined sound sections associated with a given phase can be in a specific or pre-determined order as part of the phase, e.g., the phase can contain five specific sound sections that are played in a particular order. However, it is also possible for a phase to be associated with a set of available (or selectable, permissible, etc.) sound sections, from which only a portion are selected by the soundscape generator and used to generate the phase (and hence, the soundscape) in substantially real time.

In some embodiments, the soundscape construction template can indicate one or more pre-determined sound sections that are to be played as part of a given phase (either at a particular time, or at any time within the phase)—the remaining sound sections for the phase can be adaptively determined to permit the phase to evolve beyond the sub-set of sections that are pre-determined for that phase. In some embodiments, one or more sound elements can be stored in a library or database of sound elements. In some cases, the library or database of sound elements can include or be provided by one or more of the track library 802 and/or the section library 804 of FIG. 8. The sound elements can include any or all of the different granularities described herein (e.g., single notes, chords or combinations of notes, tracks, sections, phases, soundscapes). The sound elements stored in the database/library can, in some examples, be tagged or otherwise associated with one or more different conditions, sensor inputs, user states, etc., for which the sound element is eligible to be selected by the presently disclosed soundscape generator. As such, in some examples the soundscape construction template can specify one or more tags for each phase, and the soundscape generator can then utilize the tags from the template to cross-reference the database of sound elements and make appropriate selections as it generates the phases and overall soundscape in real time. For example, in some embodiments a personalization adaptation to specific user data can be performed in a manner that is the same as or similar to the automatic determination and/or updating of user-specific sound feature preferences as previously described above.

Figure 11:
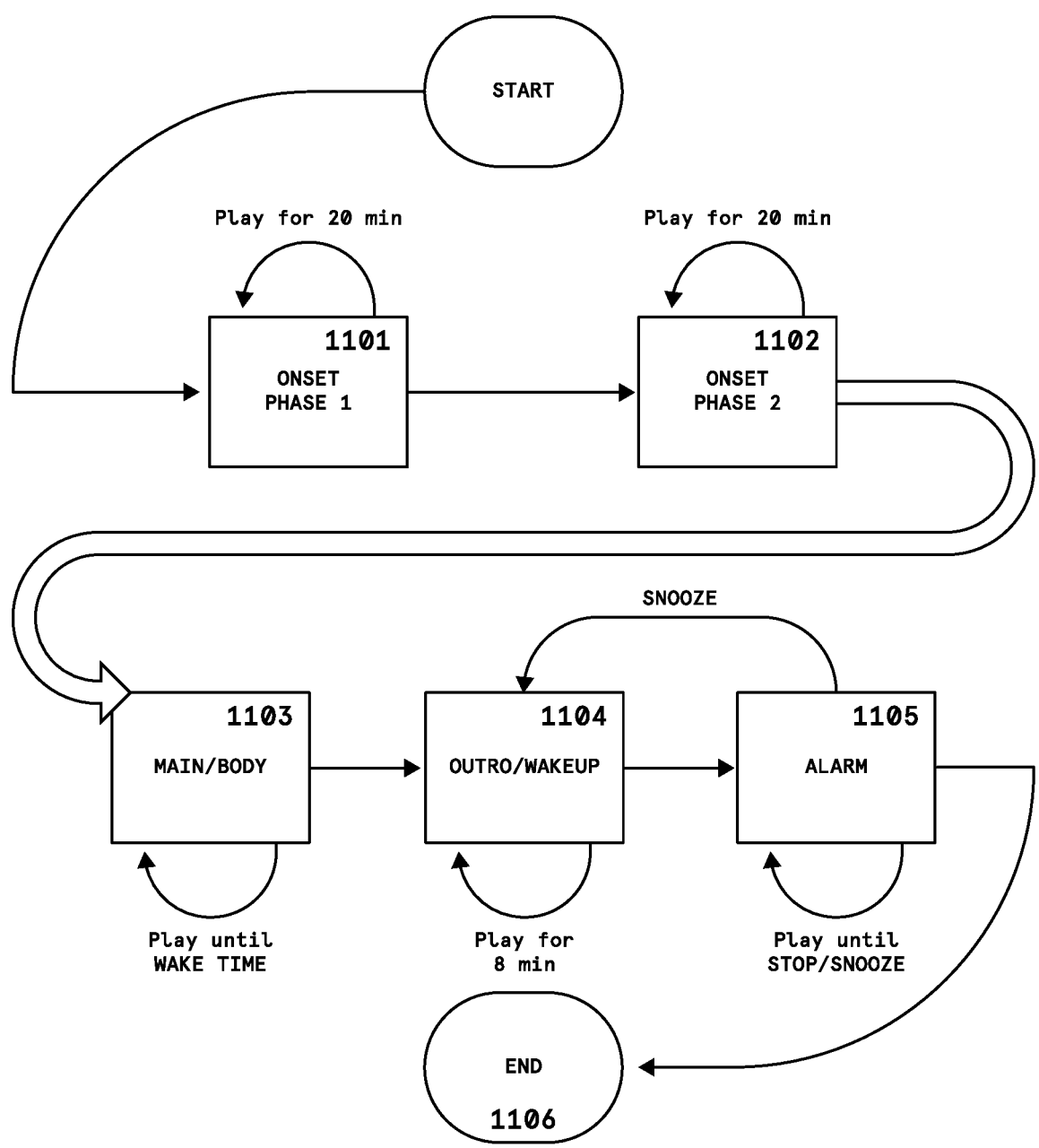
FIG. 11 illustrates an exemplary soundscape for sleep.

FIG. 11 illustrates one example of a prearranged soundscape that can be used for sleep (e.g., a sleep soundscape). The sleep soundscape can have or provide a characteristic sound environment based on one or more elements such as circadian rhythms, pentatonic scale, and sound masking (e.g., white noise). Based upon time sensor inputs (and in some embodiments, additional time sensor inputs, including but not limited to breathing and heart rate measurements), onset phase I (1101) and onset phase II (1102) can be played for a calculated duration or extent. For example, as illustrated, the onset phases 1101 and 1102 can be played for 20 minutes each, although it is noted that other time durations can also be utilized without departing form the scope of the present disclosure. In some cases, the onset phases 1101 and 1102 can both have the same calculated duration, although it is also possible for the onset phases 1101 and 1102 to have separately calculated and/or different durations. One or more of the onset phases 1101, 1102 can have characteristics of slowly reducing intensity so as to allow the user to not as deeply focus on the individual notes of the song, encouraging falling asleep.

After the completion of the final onset phase (e.g., onset phase 1102), a main body phase 1103 can play until a wake time trigger is reached, whereupon an outro/wakeup phase 1104 can be played for a pre-determined amount of time (e.g., such as 8 minutes). In some embodiments, one or more sensor inputs such as user heart rate, breathing, movement, etc., can be used as a wake time trigger to cause the sleep soundscape to transition (or determine when to transition) from the main body phase 1103 to the outro/wakeup phase 1104. In some embodiments, the one or more sensor inputs can be combined or cross-referenced with user inputs such as a user inputted alarm time, wakeup time, calendar events, etc. The one or more sensors inputs can additionally or alternatively be combined or cross-referenced with external data sources, including but not limited to a sunrise time determined for a current (e.g., GPS) location of the user.

The outro/wakeup phase 1104, may for example, have increasing intensity to encourage a gradual increase in alertness for the user until an alarm phase 1105 goes off. The alarm phase 1105 can play until the user stops or ends 1106 the presentation of the sleep soundscape. In some embodiments, the user can be provided with a snooze option or UI element, wherein user selection of the snooze option causes outro phase 1104 to be played again for the same pre-determined duration (e.g., 8 minutes) or a different (e.g., lesser) duration.

Figure 12:
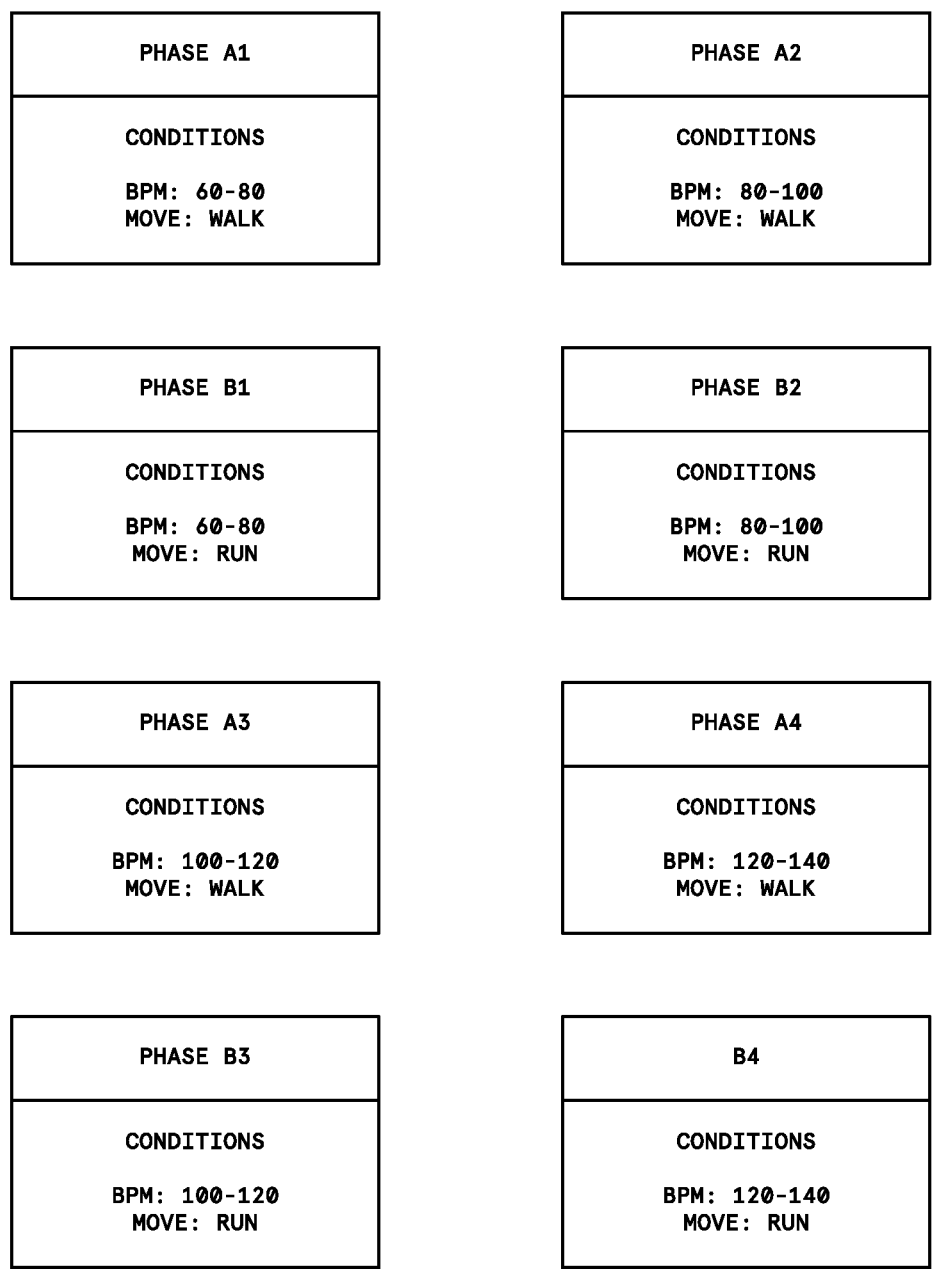
FIG. 12 illustrates various sound phases that could be used to construct a soundscape.
Figure 13:
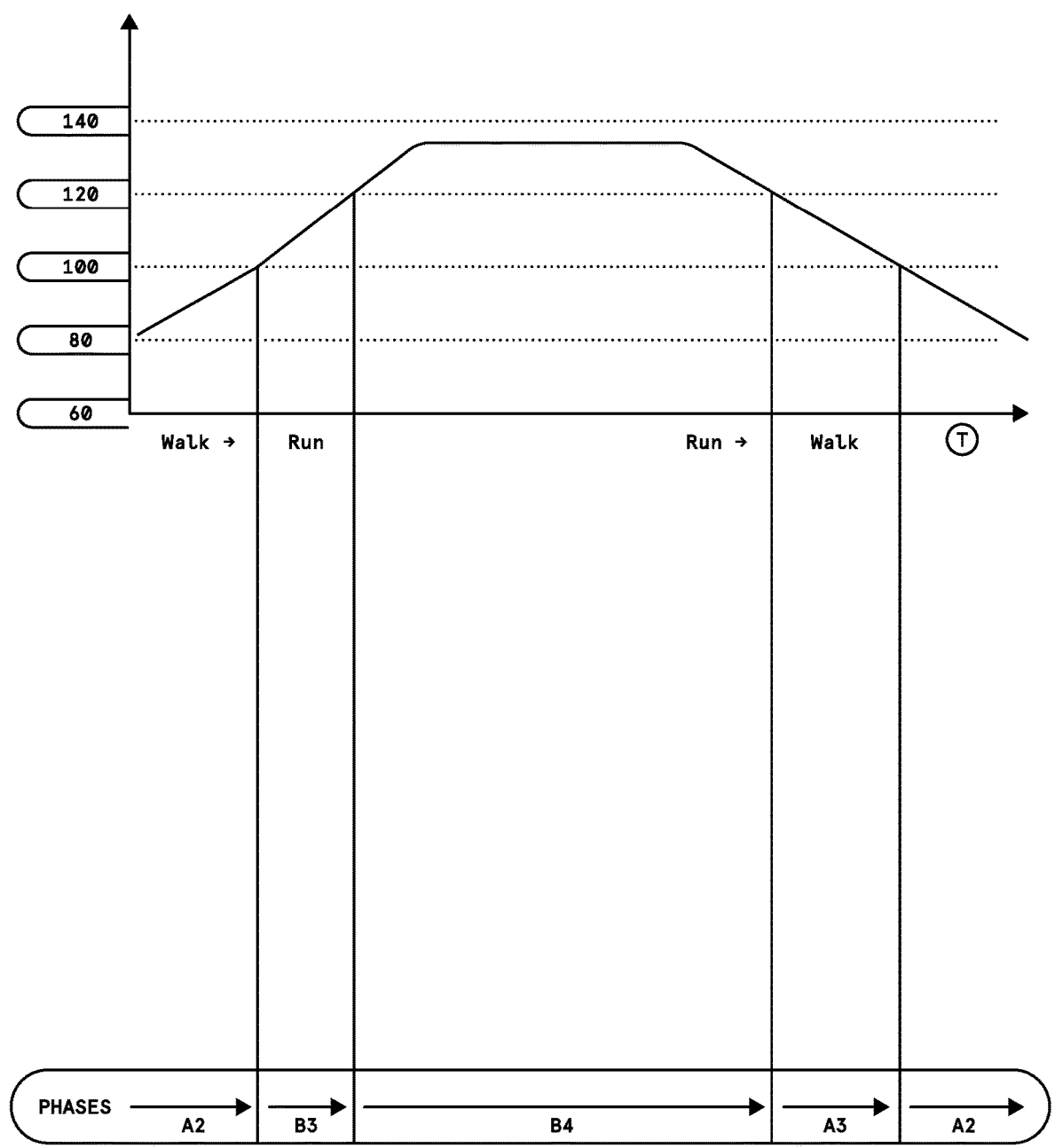
FIG. 13 illustrates how phases may be sequenced together under varying conditions to form a soundscape.

FIGS. 12-13 illustrate a dynamic soundscape generated from sound phases played at varying conditions. In FIG. 12, eight different sound phases (A1-A4 and B1-B4) are illustrated, that are triggered based upon two conditions: heart beats per minute (BPM) and a sensed user movement, shown here specifically as a sensed user cadence (e.g., walk or run). In the graph in FIG. 13, a user is walking and running—and whenever the particular condition of a sound phase is triggered, the soundscape will transition to the new sound phase. Here, the outputted soundscape will consist of phases A2 to B3 to B4 to A3 to A2.

Figure 14:
FIG. 14 illustrates an example of sequencing phases together to generate a dynamic soundscape based on one or more varying conditions.
Figure 14:
Figure 14:
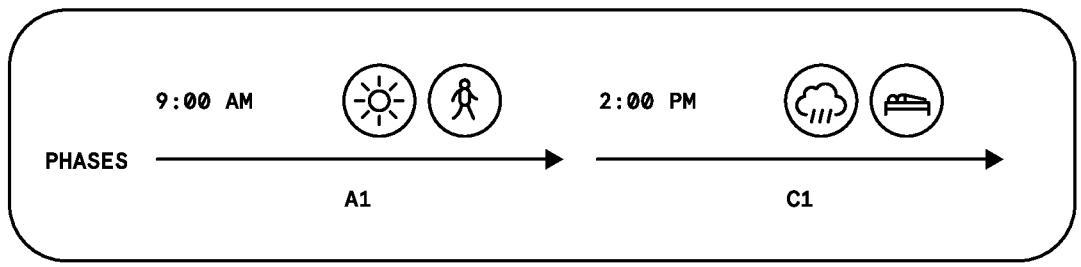

FIG. 14 further illustrates the concept of how phases may be sequenced together into a soundscape based on conditions that are present. For example, a first phase A1 can be presented in response to all of its conditions being satisfied. As illustrated, the first phase A1 trigger conditions include (but are not limited to) the time being in the morning, the weather being sunny, the user mode being active, and the user movement being walking. A second phase B1 can be presented subsequent to the first phase A1 (e.g., first phase A1 can transition to second phase B1) in response to a change in user and/or environmental conditions, such that the trigger conditions of phase A1 are no longer met and the trigger conditions of phase B1 newly become met. As illustrated, the second phase B1 trigger conditions include the time being in the morning (unchanged from phase A1), the weather being rainy, the user mode being focusing, and the user position being sitting.

A third phase C1 can be presented following second phase B1 (e.g., second phase B1 can transition to third phase C1) in response to a change in user and/or environmental conditions, such that the trigger conditions of phase B1 are no longer met and the trigger conditions of phase C1 newly become met. As illustrated, the third phase C1 trigger conditions include the time being in the afternoon, the weather being rainy, the user mode being resting, and the user position being lying down. A fourth and final phase D1 can be presented following third phase C1 (e.g., third phase C1 can transition to fourth/final phase D1) in response to a change in user and/or environmental conditions, such that the trigger conditions of phase C1 are no longer met and the trigger conditions of phase D1 newly become met. As illustrated, the fourth phase D1 trigger conditions include the time being in the evening, the weather being rainy, and the user mode being active. As illustrated, the fourth phase D1 can include only three trigger conditions, in comparison to the four trigger conditions shown for the other phaseas A1-C1. In some embodiments, the fourth phase D1 can include an empty 'move' trigger condition, e.g., requiring the presence of a 'move' condition to be currently detected for the user in order for fourth phase D1 to be triggered, without requiring any specific one of the possible or available 'move' conditions.

The automatic composition methods described above may further be utilized by performing artists and sound engineers to craft dynamic soundscapes from recorded sound sections (stamps). For example, an artist may provide a library of stamps of varying characteristics to a sound engine, which then analyzes and categorizes each stamp (such as note pattern, tempo, voice, instrument, etc.). These sections can then later be sequenced together according to desired rulesets. As discussed above, the selection of note sequences can dynamically change as the received sensor information changes or is refreshed, reflecting changes in the user's environment, state, or context. For example, the user's heartrate or blood pressure can determine the tempo of the note sequences in the form of note beats per minute, with a slower tempo presented when the user's blood pressure is relatively high or when the user is determined to be under stress. Alternately, if the system determines, based on movement, GPS, and/or heartrate that the user is running, the system can increase the tempo of the notes presented to the user. For example, the tempo can begin at 55-70 beats per minute and increase to 100 beats per minute or more to energize the user while running or working out.

The foregoing descriptions of specific exemplary embodiments of the present invention have been presented for purposes of illustration and description. They are not intended to be exhaustive nor to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

The invention claimed is:

1. A method for creating a personalized sound environment for a user, the method comprising:
    receiving output from a plurality of sensors, the sensor output detecting a state of a user and an environment in which the user is active;
    determining two or more sound sections for presentation to the user, wherein the two or more sound sections are selected from a plurality of sound sections based on the sensor output and automatically determined sound preferences of the user, wherein the automatically determined sound preferences of the user are generated based on a plurality of user feedback inputs, wherein each of the user feedback inputs is associated with a sound environment previously presented to the user;
    generating a first sound phase, wherein the first sound phase includes the two or more sound sections;
    generating a personalized sound environment for presentation to the user, wherein the personalized sound environment includes at least the first sound phase and a second sound phase; and
    presenting the personalized sound environment to the user on a user device.

2. The method of claim 1, wherein:
    each of the automatically determined sound preferences comprises a sound feature preference weight determined specific to the user and for a given sound feature, wherein the given sound feature is included in one or more sound sections of the plurality of sound sections.

3. The method of claim 2, wherein:
    the two or more sound sections are selected from the plurality of sound sections based at least in part on the sound feature preference weights, wherein the sound feature preference weights comprise a probability of selection.

4. The method of claim 1, wherein the user feedback inputs include one or more of a positive feedback for the sound environment previously presented to the user, a negative feedback for the sound environment previously presented to the user, and a playback skip input for the sound environment previously presented to the user.

5. The method of claim 1, wherein one or more of the plurality of user feedback inputs are received in response to presenting a randomized sound environment to the user, the randomized sound environment including:
    one or more sound features for which a sound feature preference weight has not been previously determined; or
    one or more sound features for which a relatively low sound feature preference weight has been previously determined.

6. The method of claim 5, wherein the randomized sound environment is presented to the user in response to receiving a user selection of a shuffle mode.

7. The method of claim 1, wherein:
    one or more of the plurality of user feedback inputs are received in response to presenting a first generated test sound environment and a second generated test sound environment to the user; and
    the one or more of the plurality of user feedback inputs comprise a user selection of a preferred one of the first generated test sound environment and the second generated test sound environment.

8. A system for creating a personalized sound environment for a user, the system comprising:
    at least one processor; and
    at least one memory storing instructions, which when executed cause the at least one processor to perform actions comprising:
        receiving output from a plurality of sensors, the sensor output detecting a state of a user and an environment in which the user is active;
        determining two or more sound sections for presentation to the user, wherein the two or more sound sections are selected from a plurality of sound sections based on the sensor output and automatically determined sound preferences of the user, wherein the automatically determined sound preferences of the user are generated based on a plurality of user feedback inputs, wherein each of the user feedback inputs is associated with a sound environment previously presented to the user;
        generating a first sound phase, wherein the first sound phase includes the two or more sound sections;
        generating a personalized sound environment for presentation to the user, wherein the personalized sound environment includes at least the first sound phase and a second sound phase; and
        presenting the personalized sound environment to the user on a user device.

9. The system of claim 8, wherein:
    each of the automatically determined sound preferences comprises a sound feature preference weight determined specific to the user and for a given sound feature, wherein the given sound feature is included in one or more sound sections of the plurality of sound sections.

10. The system of claim 9, wherein:
    the two or more sound sections are selected from the plurality of sound sections based at least in part on the sound feature preference weights, wherein the sound feature preference weights comprise a probability of selection.

11. The system of claim 9, wherein the user feedback inputs include one or more of a positive feedback for the sound environment previously presented to the user, a negative feedback for the sound environment previously presented to the user, and a playback skip input for the sound environment previously presented to the user.

12. The system of claim 9, wherein one or more of the plurality of user feedback inputs are received in response to presenting a randomized sound environment to the user, the randomized sound environment including:
one or more sound features for which a sound feature preference weight has not been previously determined; or
one or more sound features for which a relatively low sound feature preference weight has been previously determined.

13. The system of claim 12, wherein the randomized sound environment is presented to the user in response to receiving a user selection of a shuffle mode.

14. The system of claim 9, wherein:
one or more of the plurality of user feedback inputs are received in response to presenting a first generated test sound environment and a second generated test sound environment to the user; and
the one or more of the plurality of user feedback inputs comprise a user selection of a preferred one of the first generated test sound environment and the second generated test sound environment.

15. At least one non-transitory computer readable medium storing instructions, which when executed causes at least one processor to:
receive output from a plurality of sensors, the sensor output detecting a state of a user and an environment in which the user is active;
determine two or more sound sections for presentation to the user, wherein the two or more sound sections are selected from a plurality of sound sections based on the sensor output and automatically determined sound preferences of the user, wherein the automatically determined sound preferences of the user are generated based on a plurality of user feedback inputs, wherein each of the user feedback inputs is associated with a sound environment previously presented to the user;
generate a first sound phase, wherein the first sound phase includes the two or more sound sections;
generate a personalized sound environment for presentation to the user, wherein the personalized sound environment includes at least the first sound phase and a second sound phase; and
present the personalized sound environment to the user on a user device.

16. The at least one non-transitory computer readable medium of claim 15, wherein:
each of the automatically determined sound preferences comprises a sound feature preference weight determined specific to the user and for a given sound feature, wherein the given sound feature is included in one or more sound sections of the plurality of sound sections.

17. The at least one non-transitory computer readable medium of claim 15, wherein one or more of the plurality of user feedback inputs are received in response to presenting a randomized sound environment to the user, the randomized sound environment including:
one or more sound features for which a sound feature preference weight has not been previously determined; or
one or more sound features for which a relatively low sound feature preference weight has been previously determined.

18. The at least one non-transitory computer readable medium of claim 15, wherein:
the two or more sound sections are selected from the plurality of sound sections based at least in part on the sound feature preference weights, wherein the sound feature preference weights comprise a probability of selection.

19. The at least one non-transitory computer readable medium of claim 15, wherein the user feedback inputs include one or more of a positive feedback for the sound environment previously presented to the user, a negative feedback for the sound environment previously presented to the user, and a playback skip input for the sound environment previously presented to the user.

20. The at least one non-transitory computer readable medium of claim 15, wherein the randomized sound environment is presented to the user in response to receiving a user selection of a shuffle mode.

* * * * *